(12) United States Patent
Wakazono et al.

(10) Patent No.: US 8,670,185 B2
(45) Date of Patent: Mar. 11, 2014

(54) ZOOM LENS AND IMAGE PICKUP APPARATUS INCLUDING THE SAME

(75) Inventors: Tsuyoshi Wakazono, Utsunomiya (JP); Fumiaki Usui, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 13 days.

(21) Appl. No.: 13/430,784

(22) Filed: Mar. 27, 2012

(65) Prior Publication Data
US 2012/0250163 A1    Oct. 4, 2012

(30) Foreign Application Priority Data
Mar. 28, 2011 (JP) .................... 2011-069548

(51) Int. Cl.
*G02B 15/14* (2006.01)

(52) U.S. Cl.
USPC .......................... 359/683; 359/686

(58) Field of Classification Search
CPC ..... G02B 15/173; G02B 15/177; G02B 15/17
USPC ......... 359/683, 686, 687, 688, 714, 715, 700, 359/680
See application file for complete search history.

(56) References Cited

U.S. PATENT DOCUMENTS

| | | | |
|---|---|---|---|
| 5,517,361 A * | 5/1996 | Inadome et al. ............ | 359/684 |
| 5,610,769 A | 3/1997 | Shoji | |
| 5,745,300 A | 4/1998 | Usui et al. | |
| 5,808,809 A | 9/1998 | Yahagi | |
| 6,141,157 A | 10/2000 | Nurishi et al. | |
| 6,512,637 B1 | 1/2003 | Tomita | |
| 6,825,990 B2 | 11/2004 | Yoshimi et al. | |
| 6,961,188 B2 | 11/2005 | Betensky et al. | |
| 8,238,044 B2 * | 8/2012 | Wada ........................ | 359/773 |
| 8,305,692 B2 * | 11/2012 | Shimizu et al. ............ | 359/684 |
| 2003/0133200 A1 | 7/2003 | Sato | |
| 2004/0070844 A1 | 4/2004 | Sato | |
| 2007/0188888 A1 | 8/2007 | Saori | |

(Continued)

FOREIGN PATENT DOCUMENTS

| | | |
|---|---|---|
| JP | 7151966 A | 6/1995 |
| JP | 9258102 A | 10/1997 |
| JP | 2004-085846 A | 3/2004 |
| JP | 2004-309761 A | 11/2004 |

OTHER PUBLICATIONS

Extended European Search Report issued Aug. 13, 2012 for corresponding EP12001930.

(Continued)

*Primary Examiner* — James Greece
*Assistant Examiner* — Sharrief Broome
(74) *Attorney, Agent, or Firm* — Rossi, Kimms & McDowell LLP

(57) ABSTRACT

A zoom lens includes, in order from an object side: a first lens unit having positive refractive power which does not move for varying magnification; a magnification-varying lens unit including at least two lens units which move for varying magnification; an aperture stop; and an imaging lens unit having positive refractive power which does not move for varying magnification, in which: the first lens unit includes, in order from the object side, a first sub-lens unit having positive refractive power, a second sub-lens unit having negative refractive power, and a third sub-lens unit having positive refractive power; the second sub-lens unit is driven to the object side so as to perform focus adjustment to an object at a short distance; and the following expression is satisfied: $0.07 < f1/f11 < 0.35$, where $f1$ represents a focal length of the first lens unit, and $f11$ represents a focal length of the first sub-lens unit.

5 Claims, 18 Drawing Sheets

(56) References Cited

U.S. PATENT DOCUMENTS

2011/0037878 A1    2/2011    Wakazono
2011/0037880 A1    2/2011    Sakamoto
2011/0038056 A1    2/2011    Nakamura

OTHER PUBLICATIONS

Extended European Search Report issued Nov. 19, 2010 for EP 10172365.8; related U.S. Appl. No. 12/848,329.

Smith, Warren, "Modern Lens Design: A Resource Manual", McGraw Hill, 1992; XP002603812, pp. 72-75; related U.S. Appl. No. 12/848,329.

Shannon, Robert, "The Art and Science of Optical Design", Cambridge University Press, 1997; XP002603813, pp. 178-191; related U.S. Appl. No. 12/848,329.

Schott, AG "Optischer Glaskatolog-Datenblatter"; Oct. 2010, Shott, Mainz, XP002603814, pp. 4, 54, 119. in related U.S. Appl. No. 12/848,329.

Wakazono, Tsuyoshi, "Zoom Lens and Image Pickup Apparatus Including the Same", Co-pending U.S. Appl. No. 13/428,200; Application and Drawings provided.

Extended European Search Report issued Jun. 29, 2012 for EP12002247 (related U.S. Appl. No. 13/428,200).

* cited by examiner

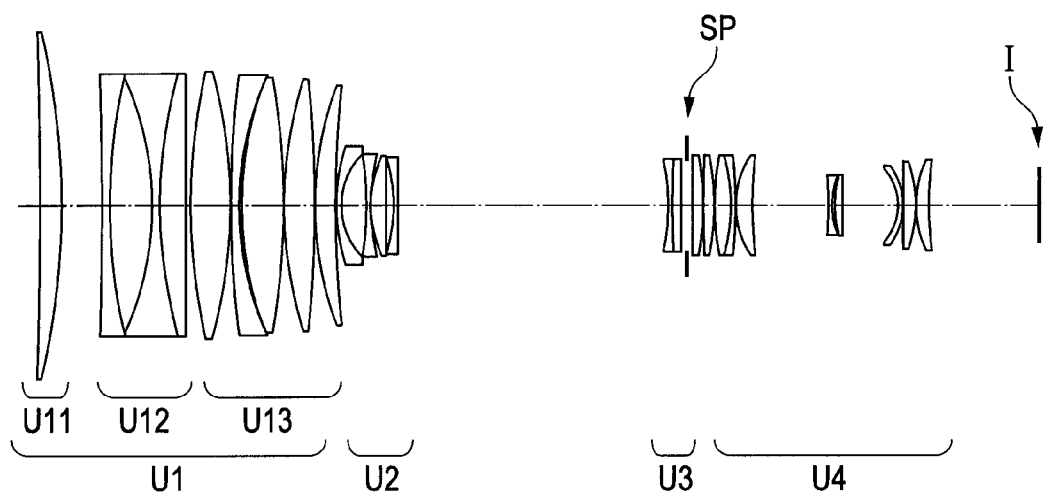
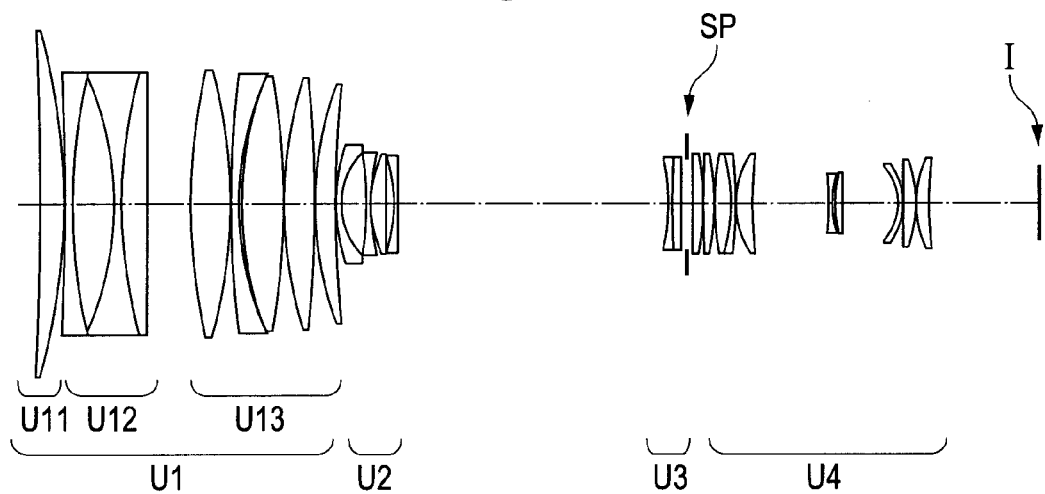

ZOOM LENS AND IMAGE PICKUP APPARATUS INCLUDING THE SAME

BACKGROUND OF THE INVENTION

1. Field of the Invention

The present invention relates to a zoom lens suitable for a television camera, a motion-picture camera, a video camera, a photography camera, and a digital camera, and more particularly, to a zoom lens having a high magnification, a small size and light weight, and little aberration deviation due to focus adjustment, and to an image pickup apparatus including the zoom lens.

2. Description of the Related Art

Conventionally, as for a zoom lens in which focus adjustment is performed by a lens unit disposed closer to an object side with respect to a magnification-varying lens unit, there are proposed various types of systems.

For instance, Japanese Patent Application Laid-Open No. 2004-309761 discloses a zoom lens in which a focus lens unit having positive refractive power as a whole includes, in order from an object side, a first lens unit having negative refractive power, a second lens unit having negative refractive power, and a third lens unit having positive refractive power. In addition, Japanese Patent Application Laid-Open No. 2004-309761 proposes a method in which the second lens moves to the object side in focus adjustment to an object at a short distance.

In addition, Japanese Patent Application Laid-Open No. 2004-85846 discloses a zoom lens in which a focus lens unit having positive refractive power as a whole includes, in order from the object side, a first lens unit having positive refractive power, a second lens unit having negative refractive power, and a third lens unit having positive refractive power. Further, Japanese Patent Application Laid-Open No. 2004-85846 proposes a method in which the third lens unit moves to the object side in focus adjustment to an object at a short distance.

The zoom lens used for a television camera, a motion-picture camera, or the like is desired to achieve a higher magnification as well as a small size and light weight in order to secure mobility and to improve flexibility of photography. In addition, the zoom lens is required to have high performance with little aberration deviation due to focus adjustment.

The focus adjustment method of Japanese Patent Application Laid-Open No. 2004-309761 is suitable for a wide-angle zoom lens, but is difficult to achieve a high magnification. In the disclosed embodiment, a zoom ratio is approximately three. In order to achieve a high magnification, a diameter or an entire length of the first lens unit is increased.

The focus adjustment method of Japanese Patent Application Laid-Open No. 2004-85846 is suitable for a telephoto zoom lens, but is difficult to achieve a high magnification. In the disclosed embodiment, a zoom ratio is approximately 2.5. In order to achieve a high magnification, a diameter or an entire length of the first lens unit is increased.

SUMMARY OF THE INVENTION

Therefore, the present invention provides a zoom lens having a focus adjustment method with little aberration deviation due to focus adjustment, and an image pickup apparatus including the zoom lens.

The exemplary embodiments of the present invention provide a zoom lens and an image pickup apparatus, the zoom lens including, in order from an object side: a first lens unit having positive refractive power which does not move for varying magnification; a magnification-varying lens unit including at least two lens units which move for varying magnification; an aperture stop; and an imaging lens unit having positive refractive power which does not move for varying magnification, in which: the first lens unit includes, in order from the object side, a first sub-lens unit having positive refractive power, a second sub-lens unit having negative refractive power, and a third sub-lens unit having positive refractive power; the second sub-lens unit is driven to the object side so as to perform focus adjustment to an object at a short distance; and the following expression is satisfied: $0.07 < f1/f11 < 0.35$, where $f1$ represents a focal length of the first lens unit, and $f11$ represents a focal length of the first sub-lens unit.

According to the exemplary embodiment of the present invention, it is possible to provide a zoom lens having a focus adjustment method with little aberration deviation due to focus adjustment, and an image pickup apparatus including the zoom lens.

Further features of the present invention will become apparent from the following description of exemplary embodiments with reference to the attached drawings.

BRIEF DESCRIPTION OF THE DRAWINGS

FIG. 2A is a lens cross sectional view at a wide-angle end when focusing at infinity according to Embodiment 1 of the present invention.

FIG. 2B is a lens cross sectional view at the wide-angle end when focusing at closest focusing distance according to Example 1 of the present invention.

FIG. 4Ab is an aberration diagram at the wide-angle end when focusing at infinity according to Embodiment 1 of the present invention.

FIG. 4Ac is an aberration diagram at the wide-angle end when focusing at closest focusing distance (1.5 m) according to Embodiment 1 of the present invention.

FIG. 4Bb is an aberration diagram at the telephoto end when focusing at infinity according to Embodiment 1 of the present invention.

FIG. 4Bc is an aberration diagram at the telephoto end when focusing at closest focusing distance (1.5 m) according to Embodiment 1 of the present invention.

FIG. 6Ab is an aberration diagram at the wide-angle end when focusing at infinity according to Embodiment 2 of the present invention.

FIG. 6Ac is an aberration diagram at the wide-angle end when focusing at closest focusing distance (1.8 m) according to Embodiment 2 of the present invention.

FIG. 6Bb is an aberration diagram at the telephoto end when focusing at infinity according to Embodiment 2 of the present invention.

FIG. 6Bc is an aberration diagram at the telephoto end when focusing at closest focusing distance (1.8 m) according to Embodiment 2 of the present invention.

FIG. 8Ab is an aberration diagram at the wide-angle end when focusing at infinity according to Embodiment 3 of the present invention.

FIG. 8Ac is an aberration diagram at the wide-angle end when focusing at closest focusing distance (1.8 m) according to Embodiment 3 of the present invention.

FIG. 8Bb is an aberration diagram at the telephoto end when focusing at infinity according to Embodiment 3 of the present invention.

FIG. 8Bc is an aberration diagram at the telephoto end when focusing at closest focusing distance (1.8 m) according to Embodiment 3 of the present invention.

FIG. 10Ab is an aberration diagram at the wide-angle end when focusing at infinity according to Embodiment 4 of the present invention.

FIG. 10Ac is an aberration diagram at the wide-angle end when focusing at closest focusing distance (3.5 m) according to Embodiment 4 of the present invention.

FIG. 10Bb is an aberration diagram at the telephoto end when focusing at infinity according to Embodiment 4 of the present invention.

FIG. 10Bc is an aberration diagram at the telephoto end when focusing at closest focusing distance (3.5 m) according to Embodiment 4 of the present invention.

FIG. 12Ab is an aberration diagram at the wide-angle end when focusing at infinity according to Embodiment 5 of the present invention.

FIG. 12Ac is an aberration diagram at the wide-angle end when focusing at closest focusing distance (1.8 m) according to Embodiment 5 of the present invention.

FIG. 12Bb is an aberration diagram at the telephoto end when focusing at infinity according to Embodiment 5 of the present invention.

FIG. 12Bc is an aberration diagram at the telephoto end when focusing at closest focusing distance (1.8 m) according to Embodiment 5 of the present invention.

DESCRIPTION OF THE EMBODIMENTS

Hereinafter, embodiments of the present invention are described in detail with reference to the attached drawings.

First, features of a zoom lens according to the present invention are described with reference to conditional expressions.

The present invention defines the structure of a first lens unit and a focus adjustment method for achieving a high performance zoom lens, which has a high magnification, a small size and light weight, and little aberration deviation due to focus adjustment. Specifically, the aberration deviation due to focus adjustment means a variation of field curvature from an object distance of infinity to a closest focusing distance.

The zoom lens according to the present invention includes, in order from an object side, a first lens unit having positive refractive power which does not move for varying magnification, a magnification-varying lens unit including at least two lens units which move for varying magnification, an aperture stop, and an imaging lens unit having positive refractive power which does not move for varying magnification. A first lens unit U1 includes, in order from the object side, a first sub-lens unit having positive refractive power, a second sub-lens unit having negative refractive power, and a third sub-lens unit having positive refractive power. The second sub-lens unit is driven to the object side so as to perform focus adjustment to an object at a short distance. In other words, the second sub-lens unit moves for focus adjustment, but the first sub-lens unit and the third sub-lens unit do not move for focus adjustment. Further, the zoom lens satisfies the following conditional expressions:

$$0.07 < f1/f11 < 0.35 \quad (1)$$

$$0.2 < f1/ft < 1.0 \quad (2)$$

where f1 represents a focal length of the first lens unit, f11 represents a focal length of the first sub-lens unit, represents and ft represents a focal length of the entire system of the zoom lens at a telephoto end.

An optical action of the present invention is described with reference to FIG. 1.

Figure 1:
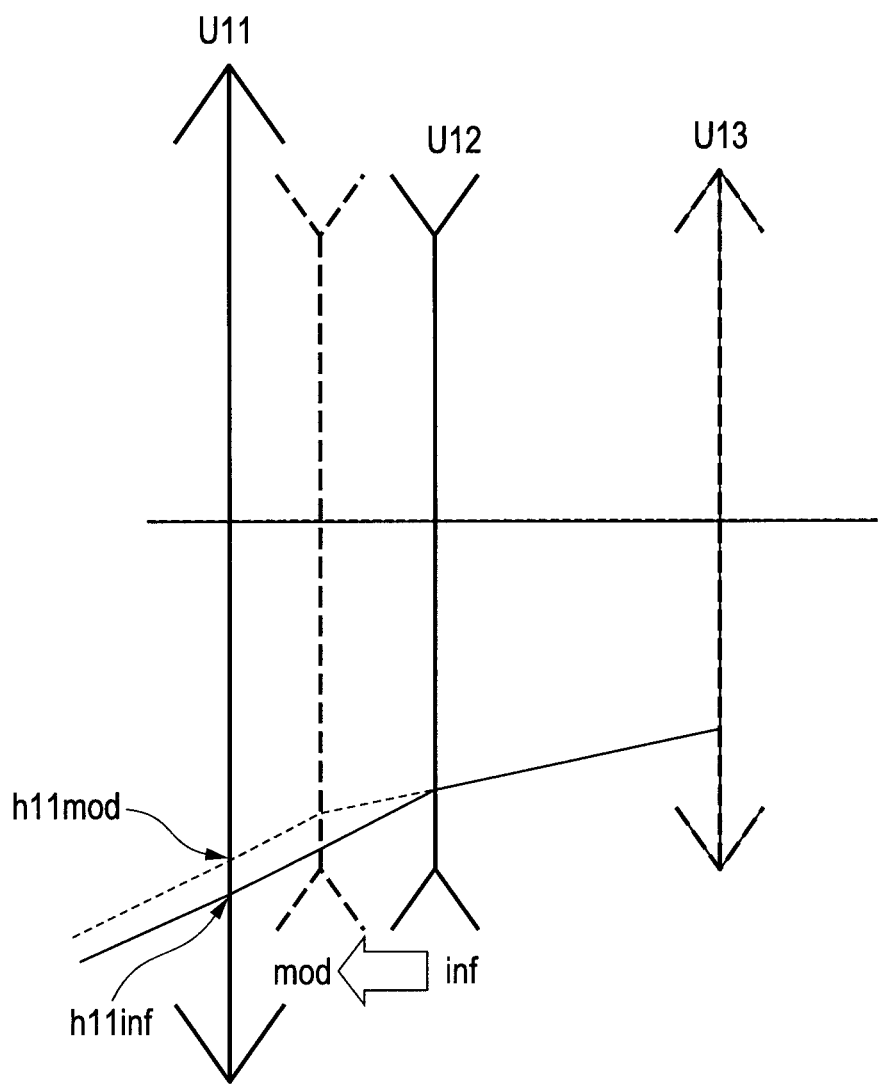
FIG. 1 is a diagram illustrating a principle of the present invention.

FIG. 1 is a conceptual diagram of an off-axis optical path of the first lens unit at an arbitrary zoom position at an object distance of infinity and closest focusing distance. In FIG. 1, the left side is the object side, and the right side is an image plane side. FIG. 1 illustrates, in order from the object side, a first sub-lens unit U11 having positive refractive power, a second sub-lens unit U12 having negative refractive power, and a third sub-lens unit U13 having positive refractive power.

The zoom lens satisfies the following relationship:

$$h11inf > h11 \bmod \quad (6)$$

where h11*inf* represents a height of an off-axis light beam of the first sub-lens unit U11 at the object distance of infinity, and h11 mod represents a height of the off-axis light beam of the first sub-lens unit U11 at the object distance of closest focusing distance.

In other words, the height of the off-axis incident light beam passing through the first sub-lens unit U11 is lower at the object distance of closest focusing distance than at the object distance of infinity. According to this effect, when the object distance varies from infinity to closest focusing distance, the field curvature varies to the over side (side away from the object side). On the other hand, when the second sub-lens unit U12 is driven to the object side so that the object distance varies from infinity to closest focusing distance, the field curvature varies to the under side (object side) on the closest focusing distance side. Thus, an extent of contribution of the first sub-lens unit U11 shifting the field curvature to the over side due to the variation of incident light beam height, and an extent of contribution of the second sub-lens unit U12 shifting the field curvature to the under side by being driven to the object side are canceled by one another, and hence the variation of the field curvature due to focus adjustment can be suppressed. However, a drive amount of the second sub-lens unit U12 is increased by an increase of power of the first sub-lens unit U11, and hence it is necessary to appropriately set the power of the first sub-lens unit U11.

Next, the above-mentioned conditional expressions (1) and (2) are described.

The expression (1) defines a ratio between the focal length f1 of the first lens unit U1 and the focal length f11 of the first sub-lens unit U11.

$$0.07 < f1/f11 < 0.35 \quad (1)$$

When the expression (1) is satisfied, the aberration deviation due to focus adjustment can be suppressed. When the upper limit of the expression (1) is not satisfied, the power of the first sub-lens unit U11 becomes too strong with respect to the first lens unit U1, and hence the drive amount of the second sub-lens unit U12 is increased. Thus, it becomes difficult to suppress the aberration deviation due to focus adjustment and to realize a small size and light weight. When the lower limit of the expression (1) is not satisfied, the power of the first sub-lens unit U11 with respect to the first lens unit U1 becomes too weak, and hence the effect of suppressing field curvature variation of the first sub-lens unit U11 in focus adjustment is eliminated. Further, it is more preferred to set the conditional expression (1) as follows.

$$0.11 < f1/f11 < 0.28 \quad (1a)$$

The expression (2) defines a ratio between the focal length f1 of the first lens unit U1 and the focal length ft of the entire system of the zoom lens at the telephoto end.

$$0.2 < f1/ft < 1.0 \quad (2)$$

When the expression (2) is satisfied, it is possible to achieve both a high magnification and suppression of the aberration deviation due to focus adjustment. When the upper limit of the expression (2) is exceeded, the focal length f1 of the first lens unit U1 with respect to the focal length ft at the telephoto end in the entire system of the zoom lens becomes too long. An object point position of the magnification-varying lens unit becomes far when the focal length of the first lens unit U1 becomes long, and hence a move amount for varying magnification is increased, with the result that it becomes difficult to realize high magnification. When the lower limit of the expression (2) is not satisfied, the power of the first lens unit U1 with respect to the focal length ft at the telephoto end in the entire system of the zoom lens becomes too strong, and hence it becomes difficult to suppress various aberrations due to the first lens unit U1. Further, it is more preferred to set the conditional expression (2) as follows.

$$0.35 < f1/ft < 0.7 \quad (2a)$$

According to another embodiment of the present invention, power of the second sub-lens unit U12 and power of the third sub-lens unit U13 of the zoom lens are defined, in order to achieve a high performance zoom lens having a high magnification, a small size and light weight, and little aberration deviation due to focus adjustment. Further, the following conditional expression is satisfied:

$$-2.5 < f12/f13 < -0.8 \quad (3)$$

where f12 represents a focal length of the second sub-lens unit U12, and f13 represents a focal length of the third sub-lens unit U13.

The expression (3) defines a ratio between the focal length f12 of the second sub-lens unit U12 and the focal length f13 of the third sub-lens unit U13. When the expression (3) is satisfied, aberration deviation due to focus adjustment can be suppressed. When the upper limit of the expression (3) is not satisfied, power of the second sub-lens unit U12 becomes too strong. Therefore, it becomes difficult to suppress the aberration deviation due to focus adjustment. When the lower limit of the expression (3) is not satisfied, power of the second sub-lens unit U12 becomes too weak. Then, a drive amount due to focus adjustment is increased, and hence it becomes difficult to achieve a small size and light weight. It is more preferred to set the conditional expression (3) as follows.

$$-1.8 < f12/f13 < -1.0 \quad (3a)$$

Further, in an image pickup apparatus including the zoom lens having the above-mentioned feature, and a solid-state image pickup element having a predetermined effective image pickup range for receiving light of an image formed by the zoom lens, the present invention defines the following condition for using the zoom lens effectively in particular:

$$0.7 < fw/IS < 2.4 \quad (4)$$

where fw represents a focal length of the entire system of the zoom lens at the wide-angle end, and IS represents an image size of the image pickup element.

When the expression (4) is satisfied, it is possible to achieve a small size and light weight as well as suppression of aberration deviation due to focus adjustment. When the upper limit of the expression (4) is not satisfied, the focal length fw of the entire system of the zoom lens at the wide-angle end becomes too long. When the lower limit of the expression (4) is not satisfied, the focal length fw of the entire system of the zoom lens at the wide-angle end becomes too short. Therefore, an incident height of an off-axis light beam of the first sub-lens unit U11 increases, and hence the lens outer diameter becomes large. Note that, it is preferred that such a magnification-varying ratio of the zoom lens that the zoom lens of the present invention is used effectively in particular be four or larger.

A zoom lens and an image pickup apparatus including the zoom lens according to embodiments of the present invention are described below.

Embodiment 1

FIGS. 2A and 2B are lens cross sectional views of a zoom lens according to Embodiment 1 (Numerical Embodiment 1) of the present invention at a wide-angle end when focusing at infinity and closest focusing distance, respectively.

In FIGS. 2A and 2B, the zoom lens of this embodiment includes, in order from the object side (left side), a focus lens unit having positive refractive power as the first lens unit U1, a variator having negative refractive power for varying magnification as a second lens unit U2, a compensator having negative refractive power as a third lens unit U3, a stop SP, an imaging lens unit having positive refractive power and an image forming action as a fourth lens unit U4, and an image pickup surface I. In this embodiment, the second lens unit U2 and the third lens unit U3 constitute the magnification-varying lens unit. The second lens unit U2 (variator) varies magnification from the wide-angle end to the telephoto end by moving monotonously on the optical axis toward the image plane side. The third lens unit U3 (compensator) moves non-linearly on the optical axis in order to correct image plane variation accompanying the magnification variation.

The first lens unit U1 in this embodiment corresponds to first to seventeenth surfaces. The first lens unit U1 includes the first sub-lens unit U11 having positive refractive power, the second sub-lens unit U12 having negative refractive power that moves toward the object side from the object distance of infinity to closest focusing distance, and the third sub-lens unit U13 having positive refractive power.

Figure 3A:
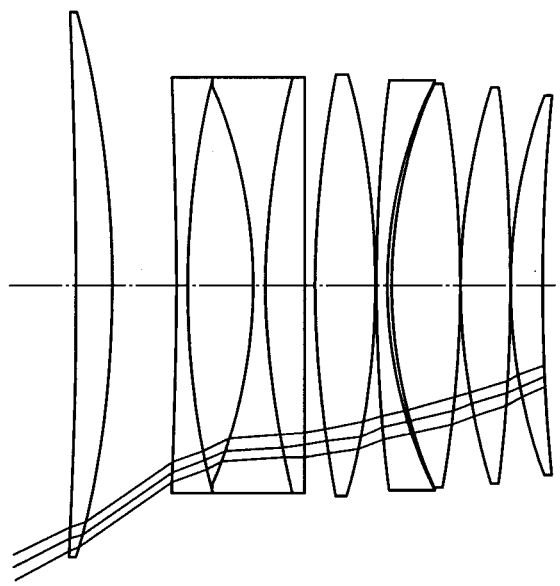
FIG. 3A is an optical path diagram at a telephoto end when focusing at infinity according to Embodiment 1 of the present invention.
Figure 3B:
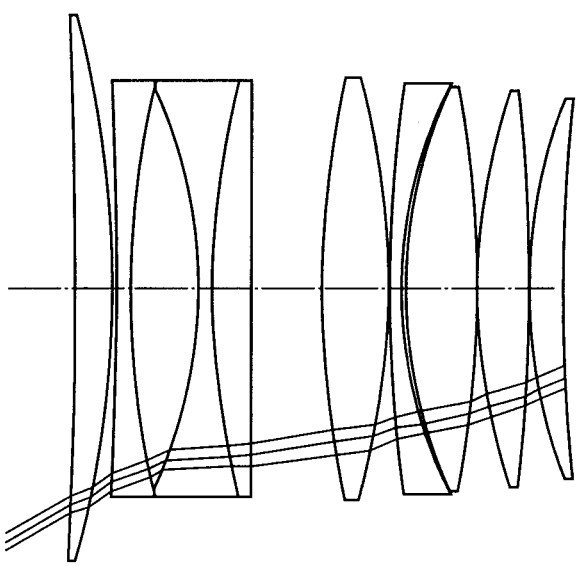
FIG. 3B is an optical path diagram at a telephoto end when focusing at closest focusing distance according to Embodiment 1 of the present invention.

FIGS. 3A and 3B respectively are optical path diagrams of the first lens unit U1 of Embodiment 1 of the present invention. In the first sub-lens unit U11, it is understood that the height of the off-axis incident light beam when focusing at infinity (FIG. 3A) is larger than the height of the off-axis incident light beam when focusing at closest focusing distance (FIG. 3B).

Figure 4A:
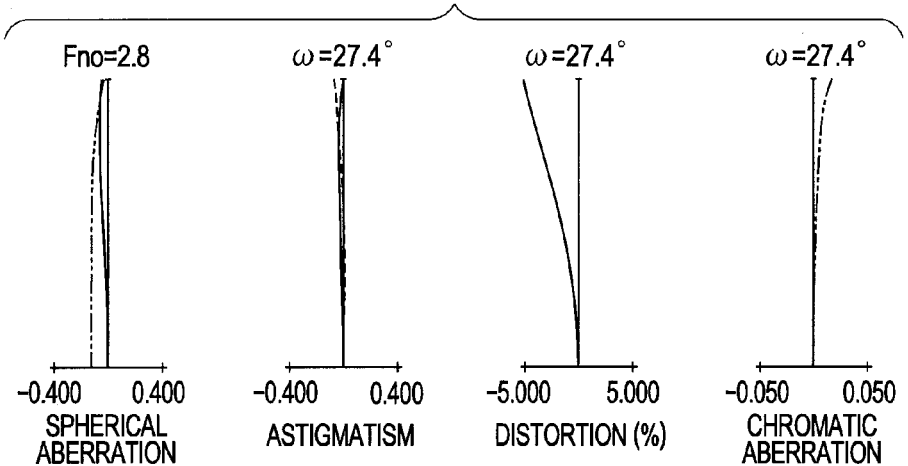
FIG. 4Aa is an aberration diagram at the wide-angle end when focusing at an object distance of 7.0 m according to Embodiment 1 of the present invention.
Figure 4A:
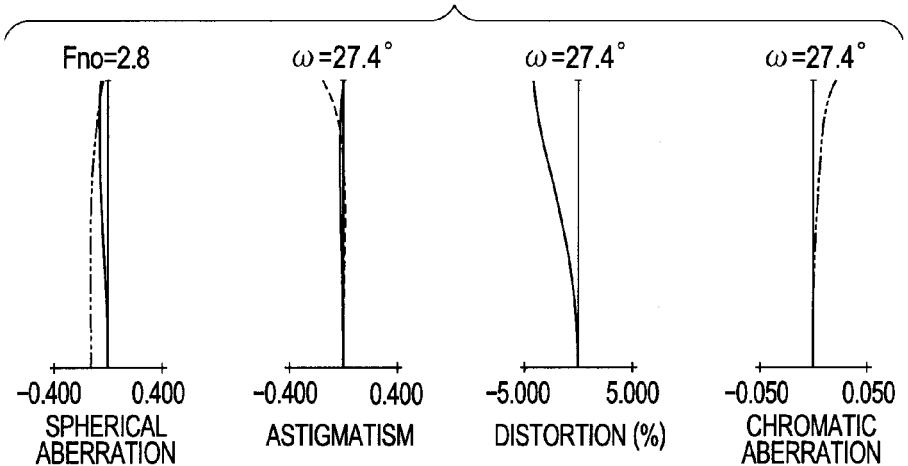
Figure 4A:
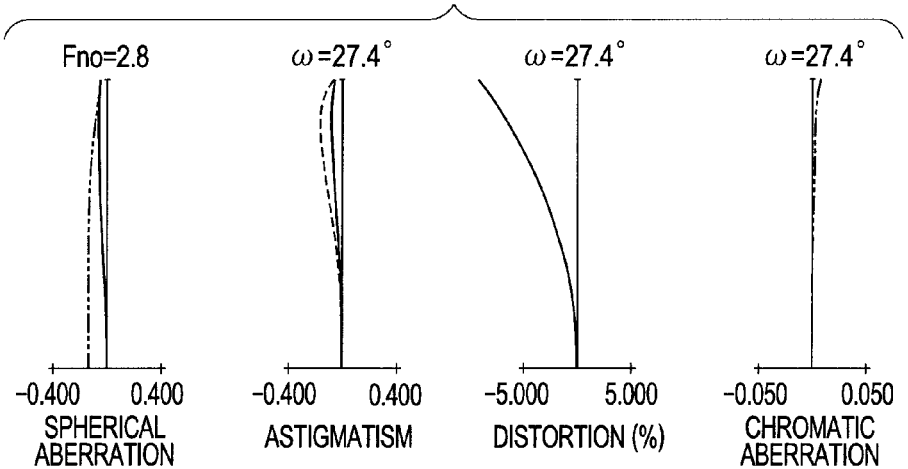
Figure 4B:
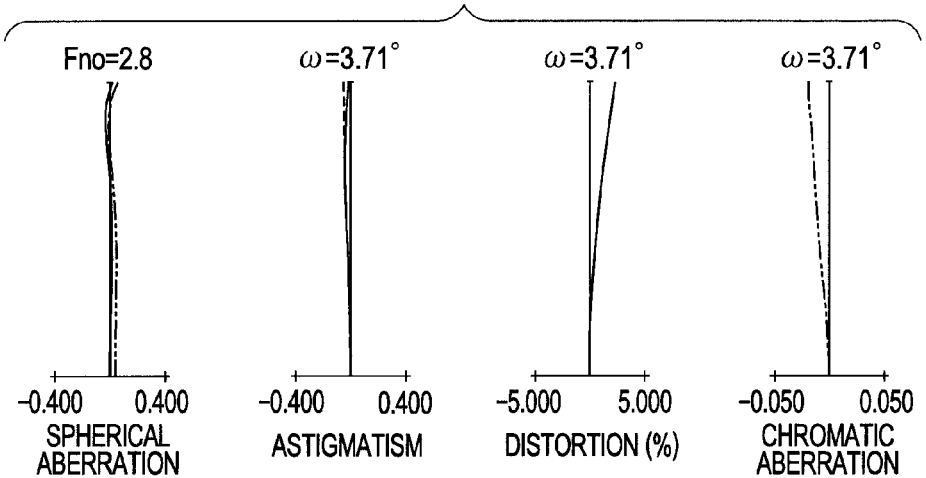
FIG. 4Ba is an aberration diagram at the telephoto end when focusing at an object distance of 7.0 m according to Embodiment 1 of the present invention.
Figure 4B:
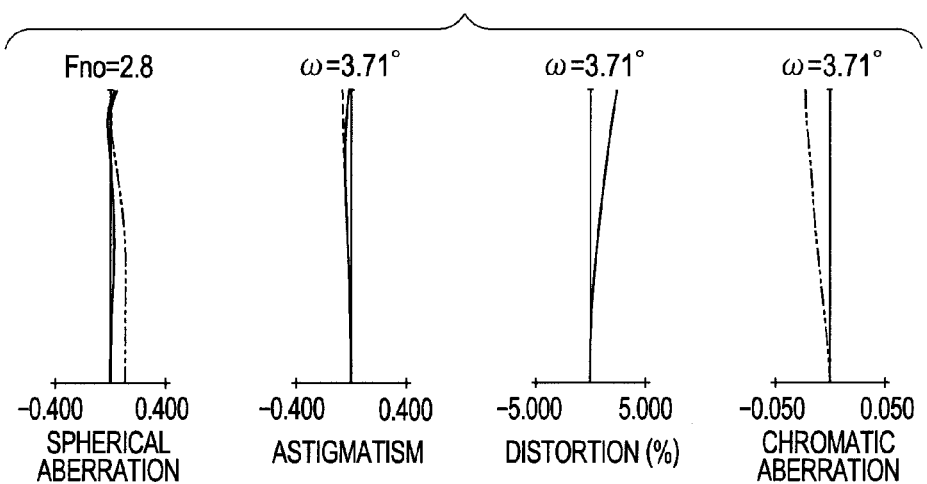
Figure 4B:
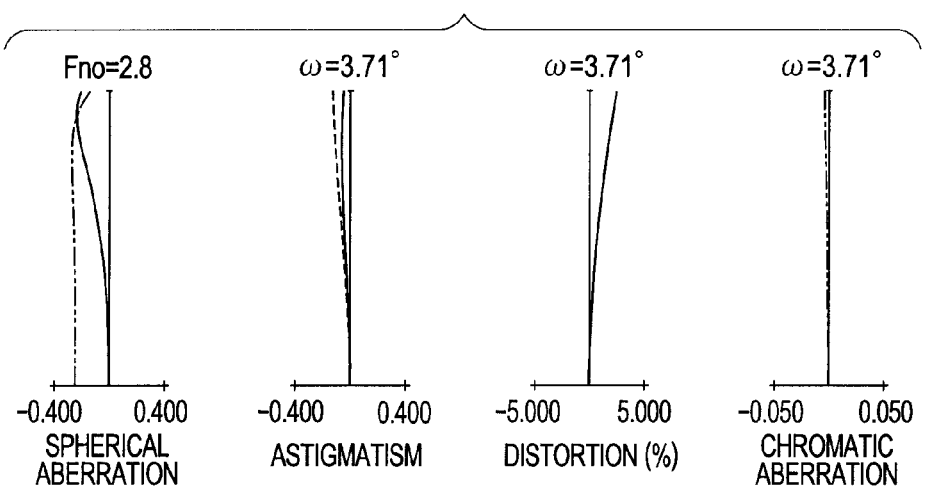

FIGS. 4Aa to 4Ac are aberration diagrams of Numerical Embodiment 1 at a wide-angle end when focusing at object distances of 7.0 m, infinity, and closest focusing distance (1.5 m), respectively. FIGS. 4Ba to 4Bc are aberration diagrams of Numerical Embodiment 1 at a telephoto end when focusing at object distances of 7.0 m, infinity, and closest focusing distance (1.5 m), respectively. Here, the object distance is a value with reference to the image plane. Note that, the aberration diagram of each embodiment illustrates spherical aberrations with respect to e-line (solid line) and g-line (two-dot and dash line), and illustrates astigmatisms on a meridional image plane (meri) (dot line) with respect to the e-line and on a sagittal image plane (sagi) (solid line) with respect to the e-line. Lateral chromatic aberration is indicated with respect to g-line (two-dot and dash line). An F number is denoted by Fno, and a half angle of field is denoted by ω. In addition, the spherical aberration, the astigmatism, the distortion, and the lateral chromatic aberration are indicated in units of 0.4 mm, 0.4 mm, 5%, and 0.05 mm, respectively.

Numerical values corresponding to the respective conditional expressions of this embodiment are shown in Table 1. This embodiment satisfies the conditional expressions (1) to (4) and achieves a high performance zoom lens having a high magnification, a small size and lightweight, and little aberration deviation due to focus adjustment.

Hereinafter, Numerical Embodiment 1 corresponding to Embodiment 1 of the present invention is described. In the following, in each of the numerical embodiments to be described below, "i" represents an order of a surface from the object side, "ri" represents a curvature radius of an i-th surface from the object side, "di" represents an interval between the i-th surface and the (i+1)th surface from the object side, and "ndi" and "υdi" respectively denote a refractive index and an Abbe constant of the i-th optical member. "BF" represents an air-equivalent back focus. When an X axis corresponds to the optical axis, an H axis corresponds to an axis perpendicular to the optical axis, a traveling direction of light corresponds to a positive direction, the aspherical shape is expressed in the following expression:

$$X = \frac{H^2/R}{1+\sqrt{1-(1+k)(H/R)^2}} + A4H^4 + A6H^6 + A8H^8 + A10H^{10} + A12H^{12}$$

where "R" represents a paraxial curvature radius, represents a conic constant, and "A4", "A6", "A8", "A10", and "A12" each denote an aspherical coefficient.

Further, in numerical values of the numerical embodiments to be described below, "e-Z" means "×10$^{-z}$".

Numerical Embodiment 1

| Unit: mm | | | | |
|---|---|---|---|---|
| Surface data | | | | |
| Surface Number | r | d | nd | vd | Effective diameter |
|---|---|---|---|---|---|
| 1 | −2169.523 | 9.00 | 1.51633 | 64.1 | 140.17 |
| 2 | −314.385 | 17.12 | | | 138.65 |
| 3 | −1314.817 | 3.00 | 1.69680 | 55.5 | 106.32 |
| 4 | 256.027 | 16.35 | | | 102.86 |
| 5 | −135.450 | 3.00 | 1.77250 | 49.6 | 102.49 |
| 6 | 214.527 | 10.00 | 1.80809 | 22.8 | 105.84 |
| 7 | −4416.376 | 2.00 | | | 106.31 |
| 8 | 265.280 | 16.00 | 1.60311 | 60.6 | 108.39 |
| 9* | −204.953 | 0.20 | | | 108.40 |
| 10 | 470.288 | 3.00 | 1.84666 | 23.8 | 105.34 |
| 11 | 133.708 | 0.78 | | | 103.29 |
| 12 | 140.997 | 17.00 | 1.43387 | 95.1 | 103.37 |
| 13 | −320.050 | 0.20 | | | 103.38 |
| 14 | 182.418 | 12.00 | 1.59240 | 68.3 | 101.75 |
| 15 | −590.022 | 0.20 | | | 100.97 |
| 16 | 149.424 | 8.00 | 1.59240 | 68.3 | 96.43 |
| 17 | 486.995 | (Variable) | | | 95.40 |
| 18 | 89.717 | 1.80 | 1.77250 | 49.6 | 48.24 |
| 19 | 31.533 | 10.06 | | | 41.62 |
| 20 | −118.868 | 1.50 | 1.60311 | 60.6 | 41.38 |
| 21 | 86.401 | 0.15 | | | 40.17 |
| 22 | 49.488 | 6.24 | 1.80518 | 25.4 | 40.06 |
| 23 | −15259.953 | 3.00 | | | 39.23 |
| 24 | −68.145 | 1.50 | 1.77250 | 49.6 | 39.12 |
| 25 | −3979.779 | (Variable) | | | 38.54 |
| 26 | −85.815 | 1.50 | 1.80400 | 46.6 | 35.00 |
| 27 | 321.459 | 3.50 | 1.92286 | 18.9 | 36.14 |
| 28 | −700.345 | (Variable) | | | 36.88 |
| 29 (Stop) | ∞ | 2.00 | | | 38.21 |
| 30 | 1156.972 | 4.20 | 1.62041 | 60.3 | 39.26 |
| 31 | −118.359 | 0.20 | | | 39.91 |
| 32 | 1169.967 | 4.20 | 1.62041 | 60.3 | 40.40 |
| 33 | −103.147 | 0.20 | | | 40.67 |
| 34 | 135.391 | 6.50 | 1.43875 | 94.9 | 40.54 |
| 35 | −71.283 | 1.60 | 1.84666 | 23.8 | 40.30 |
| 36 | −253.564 | 0.20 | | | 40.46 |
| 37 | 40.391 | 6.50 | 1.61800 | 63.3 | 40.10 |

-continued

Unit: mm

| 38 | 170.242 | 30.53 | | | 39.05 |
|---|---|---|---|---|---|
| 39 | −157.350 | 1.20 | 2.00330 | 28.3 | 23.85 |
| 40 | 37.528 | 0.90 | | | 23.85 |
| 41 | 61.846 | 3.35 | 1.92286 | 18.9 | 23.95 |
| 42 | −1434.512 | 21.54 | | | 24.31 |
| 43 | −23.105 | 2.00 | 1.90366 | 31.3 | 29.49 |
| 44 | −29.181 | 0.15 | | | 31.82 |
| 45 | −1389.536 | 5.00 | 1.61800 | 63.3 | 34.54 |
| 46 | −51.387 | 0.15 | | | 35.25 |
| 47 | 52.270 | 5.00 | 1.48749 | 70.2 | 36.08 |
| 48 | 143.875 | | | | 35.63 |
| Image plane | ∞ | | | | |

Aspherical surface data
Ninth surface

| K = −3.69523e+000 | A4 = −1.63293e−008 | A6 = 1.65333e−012 |
|---|---|---|
| A8 = −2.91145e−016 | A10 = 4.33793e−020 | A12 = −3.27158e−024 |

Various data

| Zoom ratio | 8.00 | | | | |
|---|---|---|---|---|---|
| Focal length | 30.00 | 60.00 | 90.00 | 120.00 | 240.00 |
| F-Number | 2.80 | 2.80 | 2.80 | 2.80 | 2.80 |
| Angle of field | 27.40 | 14.53 | 9.80 | 7.38 | 3.71 |
| Image height | 15.55 | 15.55 | 15.55 | 15.55 | 15.55 |
| Total lens length | 397.08 | 397.08 | 397.08 | 397.08 | 397.08 |
| BF | 43.65 | 43.65 | 43.65 | 43.65 | 43.65 |
| d17 | 0.70 | 48.07 | 68.46 | 80.51 | 102.64 |
| d25 | 107.72 | 49.84 | 25.57 | 13.22 | 5.48 |
| d28 | 2.50 | 13.01 | 16.89 | 17.19 | 2.80 |
| Entrance pupil position | 121.39 | 212.72 | 281.69 | 337.22 | 485.52 |
| Exit pupil position | −216.79 | −216.79 | −216.79 | −216.79 | −216.79 |
| Front principal point position | 147.94 | 258.90 | 340.59 | 401.93 | 504.36 |
| Rear principal point position | 13.65 | −16.35 | −46.35 | −76.35 | −196.35 |

Zoom lens unit data

| Unit | First surface | Focal length | Lens structure length | Front principal point position | Rear principal point position |
|---|---|---|---|---|---|
| 1 | 1 | 150.19 | 117.84 | 93.74 | 15.23 |
| 2 | 18 | −41.06 | 24.24 | 7.07 | −10.78 |
| 3 | 26 | −130.63 | 5.00 | −0.50 | −3.15 |
| 4 | 29 | 68.89 | 95.42 | 40.89 | −116.21 |

Embodiment 2

Figure 5A:
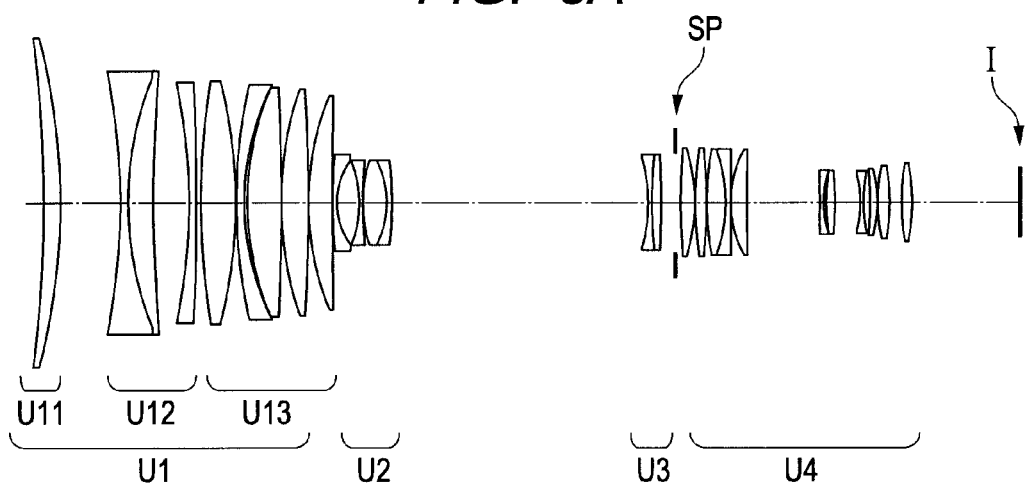
FIG. 5A is a lens cross sectional view at the wide-angle end when focusing at infinity according to Embodiment 2 of the present invention.
Figure 5B:
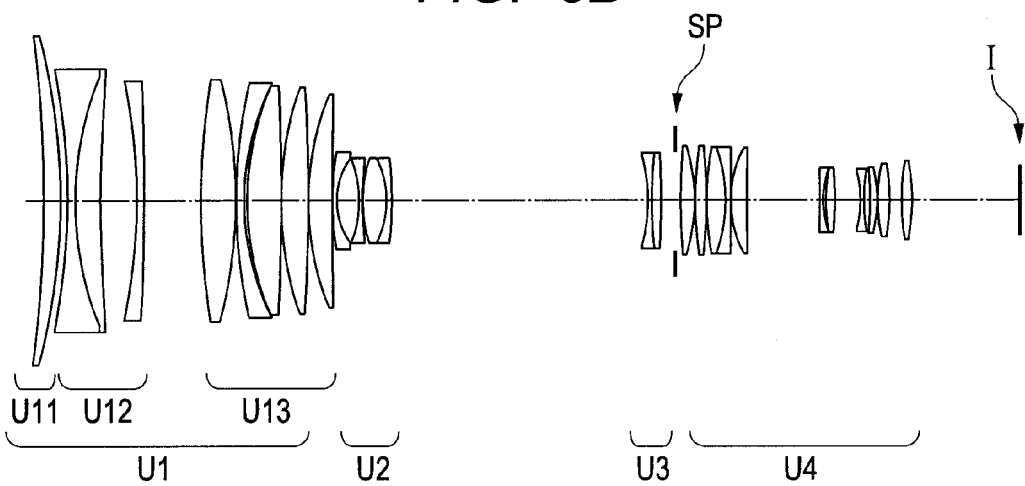
FIG. 5B is a lens cross sectional view at the wide-angle end when focusing at closest focusing distance according to Embodiment 2 of the present invention.

FIGS. 5A and 5B are lens cross sectional views of a zoom lens according to Embodiment 2 (Numerical Embodiment 2) of the present invention at a wide-angle end when focusing at infinity and closest focusing distance, respectively.

In FIGS. 5A and 5B, the zoom lens of this embodiment includes, in order from the object side (left side), a focus lens unit having positive refractive power as the first lens unit U1, a variator having negative refractive power for varying magnification as a second lens unit U2, a compensator having negative refractive power as a third lens unit U3, a stop SP, an imaging lens unit having positive refractive power and an image forming action as a fourth lens unit U4, and an image pickup surface I. In this embodiment, the second lens unit U2 and the third lens unit U3 constitute the magnification-varying lens unit. The second lens unit U2 (variator) varies magnification from the wide-angle end to the telephoto end by moving monotonously on the optical axis toward the image plane side. The third lens unit U3 (compensator) moves non-linearly on the optical axis in order to correct image plane variation accompanying the magnification variation.

The first lens unit U1 in this embodiment corresponds to first to seventeenth surfaces. The first lens unit U1 includes the first sub-lens unit U11 having positive refractive power, the second sub-lens unit U12 having negative refractive power that moves toward the object side from the object distance of infinity to closest focusing distance, and the third sub-lens unit U13 having positive refractive power.

Figure 6A:
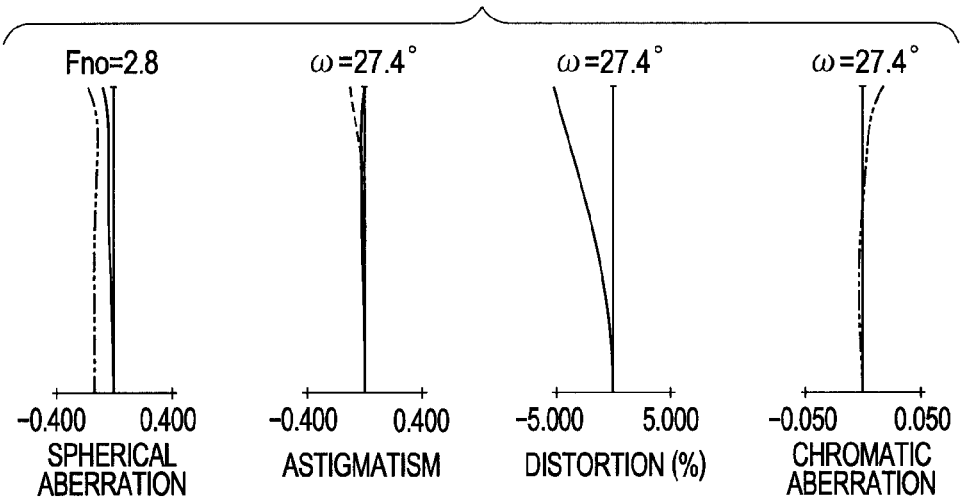
FIG. 6Aa is an aberration diagram at the wide-angle end when focusing at an object distance of 7.0 m according to Embodiment 2 of the present invention.
Figure 6A:
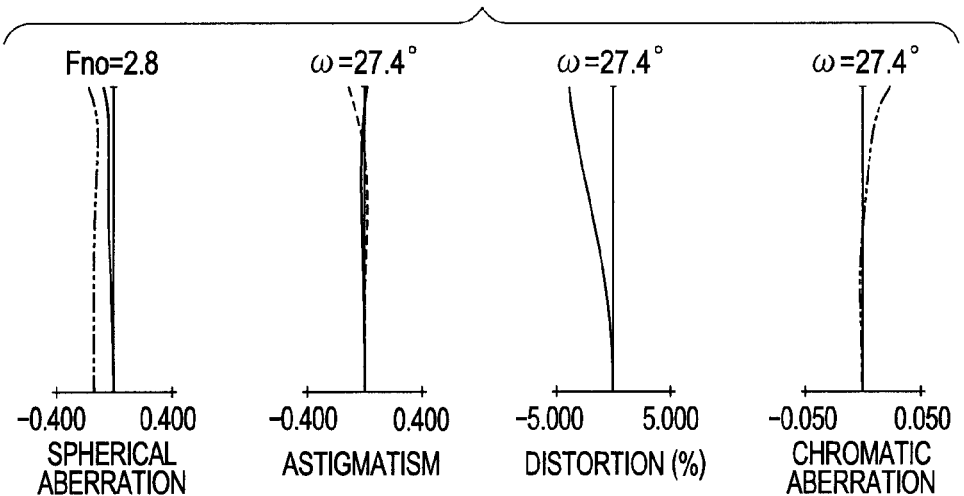
Figure 6A:
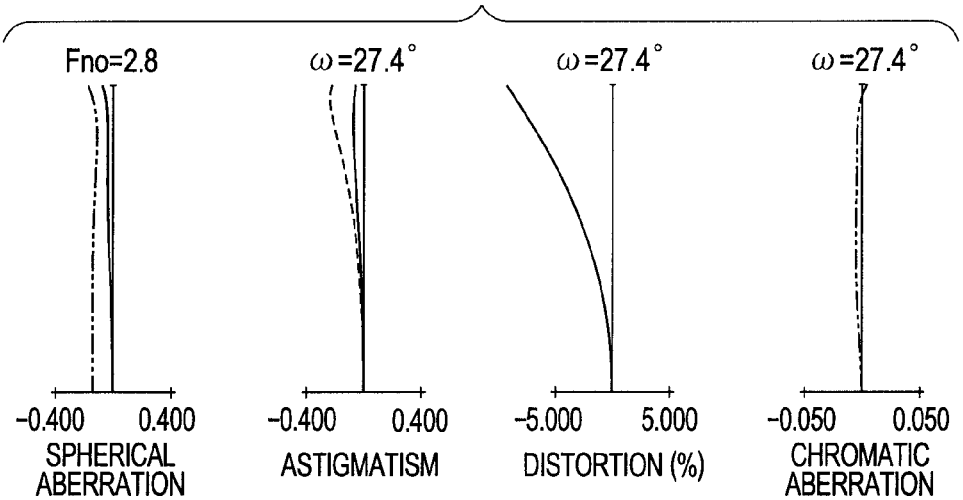
Figure 6B:
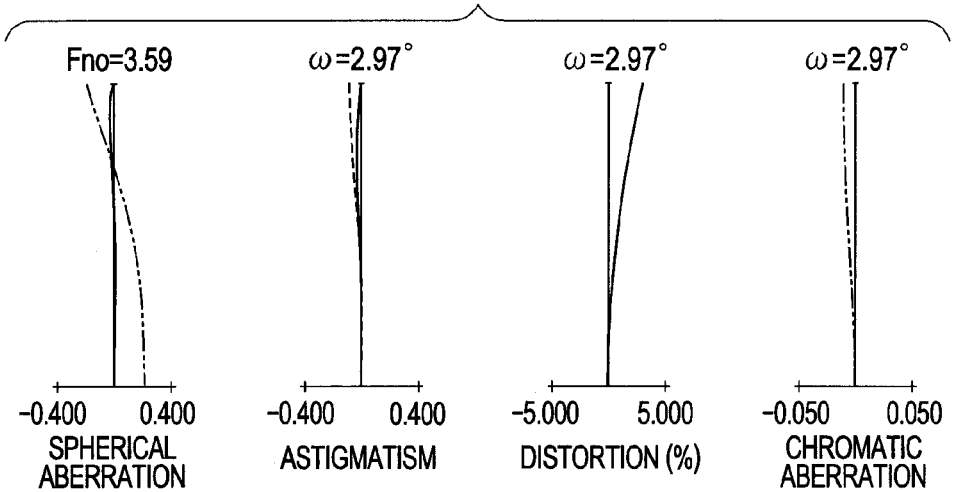
FIG. 6Ba is an aberration diagram at the telephoto end when focusing at an object distance of 7.0 m according to Embodiment 2 of the present invention.
Figure 6B:
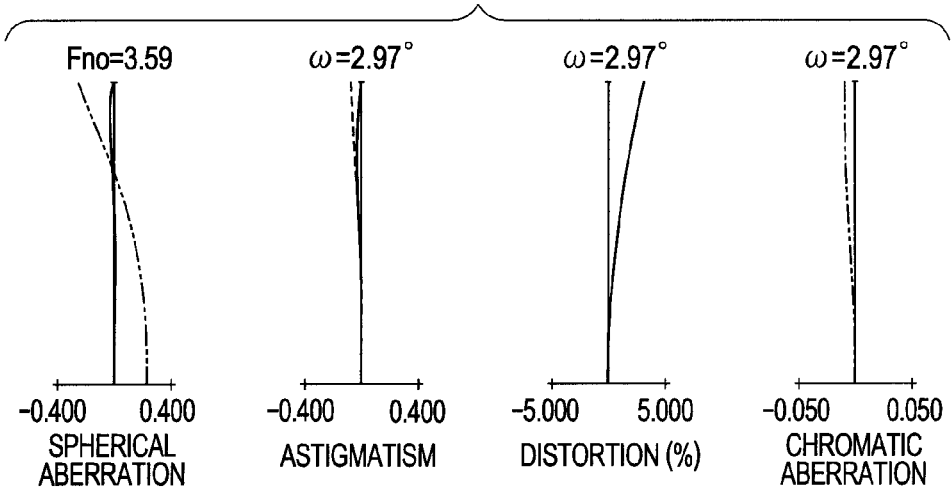
Figure 6B:
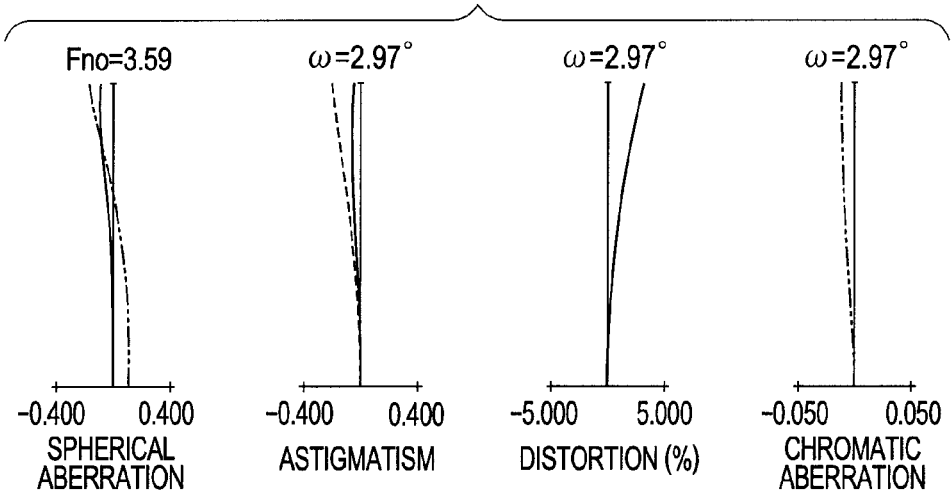

FIGS. 6Aa to 6Ac illustrate aberration diagrams of Numerical Embodiment 2 at a wide-angle end when focusing at object distances of 7.0 m, infinity, and closest focusing distance (1.8 m), respectively. FIGS. 6Ba to 6Bc illustrate aberration diagrams of Numerical Embodiment 2 at a telephoto end when focusing at object distances of 7.0 m, infinity, and closest focusing distance (1.8 m), respectively. Here, the object distance is a value with reference to the image plane.

Numerical values corresponding to the respective conditional expressions of this embodiment are shown in Table 1. This embodiment satisfies the conditional expressions (1) to (4) and achieves a high performance zoom lens having a high magnification, a small size and light weight, and little aberration deviation due to focus adjustment.

Numerical Embodiment 2

Unit: mm

Surface data

| Surface Number | r | d | nd | vd | Effective diameter |
|---|---|---|---|---|---|
| 1 | −583.706 | 6.99 | 1.51633 | 64.1 | 140.02 |
| 2 | −302.329 | 24.84 | | | 138.26 |
| 3 | −311.056 | 3.30 | 1.77250 | 49.6 | 112.24 |
| 4 | 151.251 | 10.36 | 1.80809 | 22.8 | 104.39 |
| 5 | 601.269 | 15.14 | | | 103.77 |
| 6 | −279.478 | 3.20 | 1.88300 | 40.8 | 102.12 |
| 7 | −1295.913 | 1.50 | | | 102.60 |
| 8 | 343.747 | 14.61 | 1.60311 | 60.6 | 102.99 |
| 9* | −225.217 | 0.20 | | | 102.98 |
| 10 | 248.998 | 3.00 | 2.00069 | 25.5 | 100.09 |
| 11 | 119.891 | 1.20 | | | 97.33 |
| 12 | 121.781 | 14.19 | 1.43387 | 95.1 | 97.56 |
| 13 | −1565.731 | 0.20 | | | 97.18 |
| 14 | 162.683 | 11.33 | 1.43387 | 95.1 | 95.57 |
| 15 | −1246.319 | 0.20 | | | 94.52 |
| 16 | 130.686 | 9.58 | 1.59240 | 68.3 | 89.93 |
| 17 | 1286.637 | (Variable) | | | 88.54 |
| 18* | 252.754 | 1.50 | 1.81600 | 46.6 | 40.77 |
| 19 | 30.696 | 9.82 | | | 35.54 |
| 20 | −46.564 | 1.30 | 1.61800 | 63.3 | 35.24 |
| 21 | 160.927 | 0.15 | | | 35.61 |
| 22 | 66.516 | 9.66 | 1.72047 | 34.7 | 36.01 |
| 23 | −44.329 | 0.97 | | | 35.68 |
| 24 | −36.785 | 1.30 | 1.61800 | 63.3 | 35.53 |
| 25 | −175.868 | (Variable) | | | 35.24 |
| 26 | −78.826 | 1.50 | 1.78800 | 47.4 | 37.94 |
| 27 | 174.967 | 4.00 | 1.80809 | 22.8 | 39.62 |
| 28 | −400.996 | (Variable) | | | 40.41 |
| 29 (Stop) | ∞ | 2.00 | | | 43.90 |
| 30 | 227.851 | 6.00 | 1.62041 | 60.3 | 45.57 |
| 31 | −85.865 | 0.20 | | | 45.98 |
| 32 | 163.304 | 5.00 | 1.62041 | 60.3 | 46.19 |
| 33 | −232.045 | 0.20 | | | 46.01 |
| 34 | 153.704 | 8.00 | 1.49700 | 81.5 | 45.22 |
| 35 | −67.267 | 1.50 | 2.00069 | 25.5 | 44.52 |
| 36 | 779.316 | 0.15 | | | 44.42 |
| 37 | 47.133 | 7.00 | 1.61800 | 63.3 | 44.52 |
| 38 | 418.656 | 31.11 | | | 43.75 |
| 39 | −2183.154 | 1.00 | 1.90366 | 31.3 | 26.47 |
| 40 | 35.989 | 0.92 | | | 26.20 |
| 41 | 41.236 | 4.50 | 1.92286 | 18.9 | 26.61 |
| 42 | −164.315 | 11.15 | | | 26.55 |

-continued

Unit: mm

| | | | | | |
|---|---|---|---|---|---|
| 43 | −39.958 | 1.00 | 2.00330 | 28.3 | 24.36 |
| 44 | 66.149 | 2.55 | | | 25.22 |
| 45 | −372.241 | 3.50 | 1.51633 | 64.1 | 26.26 |
| 46 | −54.308 | 0.15 | | | 27.46 |
| 47 | 82.898 | 5.00 | 1.51633 | 64.1 | 29.58 |
| 48 | −105.535 | 5.00 | | | 30.31 |
| 49 | 114.638 | 4.50 | 1.48749 | 70.2 | 32.31 |
| 50 | −97.659 | | | | 32.49 |
| Image plane | ∞ | | | | |

Aspherical surface data

Ninth surface

K = −5.66068e−001  A4 = 1.51067e−008  A6 = −3.75472e−013
A8 = −2.28484e−017  A10 = 6.24661e−021  A12 = 2.42363e−024

Eighteenth surface

K = 3.11849e−001  A4 = 6.91320e−007  A6 = 2.21769e−010
A8 = −3.87899e−012  A10 = −4.65629e−015  A12 = 6.08638e−019
A9 = 2.74177e−013

Various data

| | | | | | |
|---|---|---|---|---|---|
| Zoom ratio | 10.00 | | | | |
| Focal length | 30.00 | 60.00 | 90.00 | 120.00 | 300.00 |
| F-Number | 2.80 | 2.80 | 2.80 | 2.80 | 3.59 |
| Angle of field | 27.40 | 14.53 | 9.80 | 7.38 | 2.97 |
| Image height | 15.55 | 15.55 | 15.55 | 15.55 | 15.55 |
| Total lens length | 409.78 | 409.78 | 409.78 | 409.78 | 409.78 |
| BF | 45.49 | 45.49 | 45.49 | 45.49 | 45.49 |
| d17 | 0.70 | 47.08 | 66.85 | 78.43 | 104.40 |
| d25 | 107.08 | 50.44 | 26.54 | 14.05 | 6.88 |
| d28 | 6.05 | 16.31 | 20.43 | 21.35 | 2.55 |
| Entrance pupil position | 122.73 | 219.68 | 296.76 | 362.16 | 635.87 |
| Exit pupil position | −125.98 | −125.98 | −125.98 | −125.98 | −125.98 |
| Front principal point position | 147.48 | 258.69 | 339.52 | 398.18 | 411.00 |
| Rear principal point position | 15.49 | −14.51 | −44.51 | −74.51 | −254.51 |

Zoom lens unit data

| Unit | First surface | Focal length | Lens structure length | Front principal point position | Rear principal point position |
|---|---|---|---|---|---|
| 1 | 1 | 148.37 | 119.84 | 91.77 | 5.83 |
| 2 | 18 | −37.80 | 24.70 | 1.29 | −17.79 |
| 3 | 26 | −128.07 | 5.50 | −0.81 | −3.87 |
| 4 | 29 | 59.92 | 100.43 | 17.63 | −101.00 |

Embodiment 3

Figure 7A:
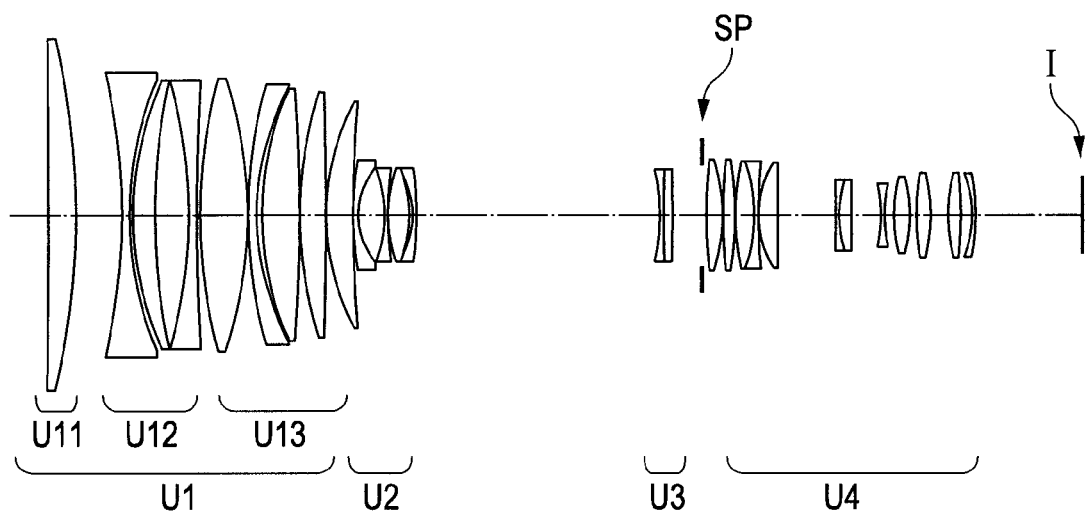
FIG. 7A is a lens cross sectional view at the wide-angle end when focusing at infinity according to Embodiment 3 of the present invention.
Figure 7B:
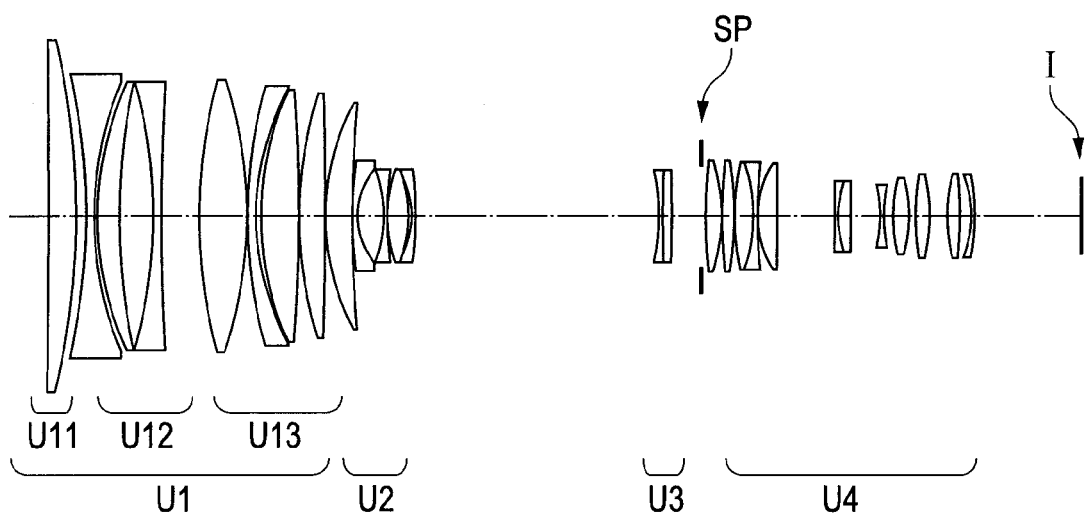
FIG. 7B is a lens cross sectional view at the wide-angle end when focusing at closest focusing distance according to Embodiment 3 of the present invention.

FIGS. 7A and 7B are lens cross sectional views of a zoom lens according to Embodiment 3 (Numerical Embodiment 3) of the present invention at a wide-angle end when focusing at infinity and closest focusing distance, respectively.

FIGS. 7A and 7B illustrate, in order from the object side (left side), a focus lens unit having positive refractive power as the first lens unit U1, a variator having negative refractive power for varying magnification as a second lens unit U2, a compensator having negative refractive power as a third lens unit U3, a stop SP, an imaging lens unit having positive refractive power and an image forming action as a fourth lens unit U4, and an image pickup surface I. In this embodiment, the second lens unit U2 and the third lens unit U3 constitute the magnification-varying lens unit. The second lens unit U2 (variator) varies magnification from the wide-angle end to the telephoto end by moving monotonously on the optical axis toward the image plane side. The third lens unit U3 (compensator) moves non-linearly on the optical axis in order to correct image plane variation accompanying the magnification variation.

The first lens unit U1 in this embodiment corresponds to first to eighteenth surfaces. The first lens unit U1 includes the first sub-lens unit U11 having positive refractive power, the second sub-lens unit U12 having negative refractive power that moves toward the object side from the object distance of infinity to the closest focusing distance, and the third sub-lens unit U13 having positive refractive power.

Figure 8A:
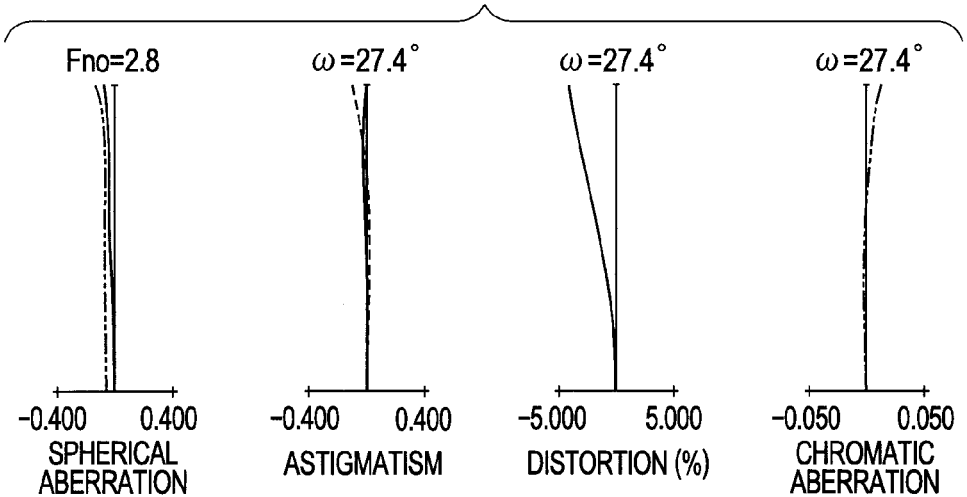
FIG. 8Aa is an aberration diagram at the wide-angle end when focusing at an object distance of 7.0 m according to Embodiment 3 of the present invention.
Figure 8A:
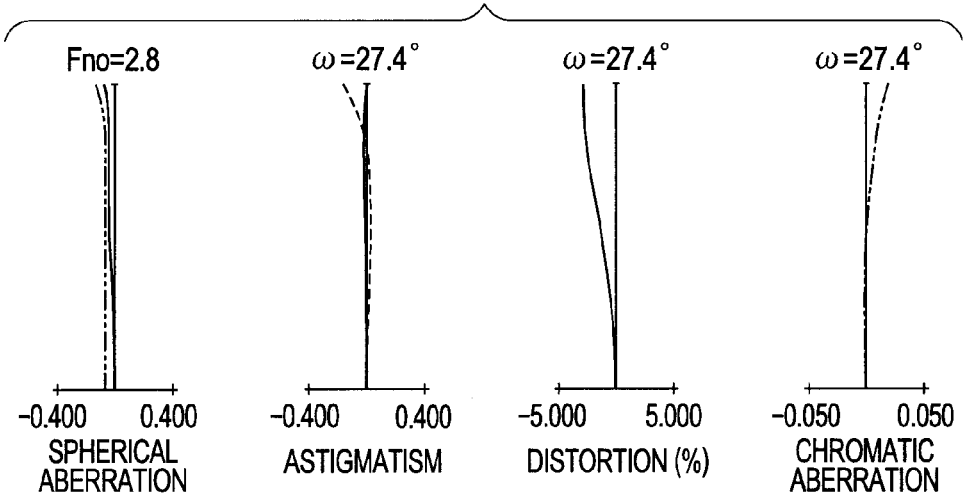
Figure 8A:
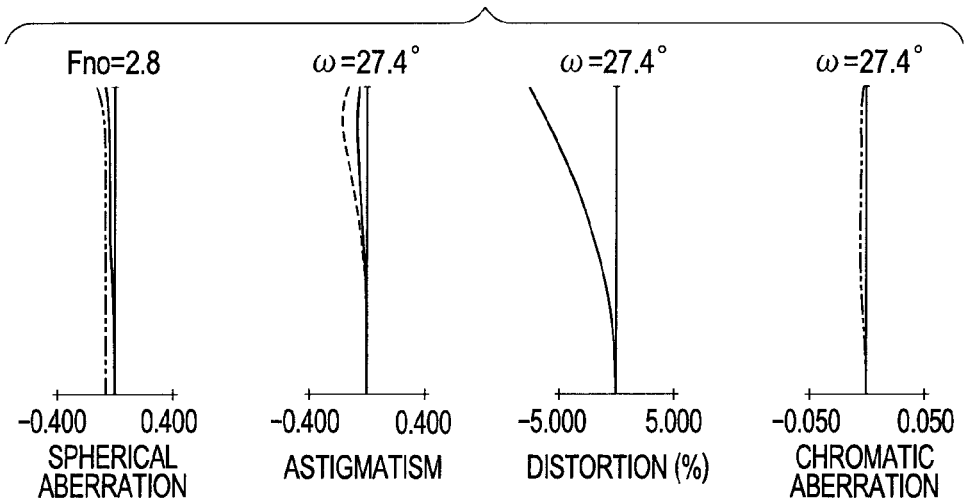
Figure 8B:
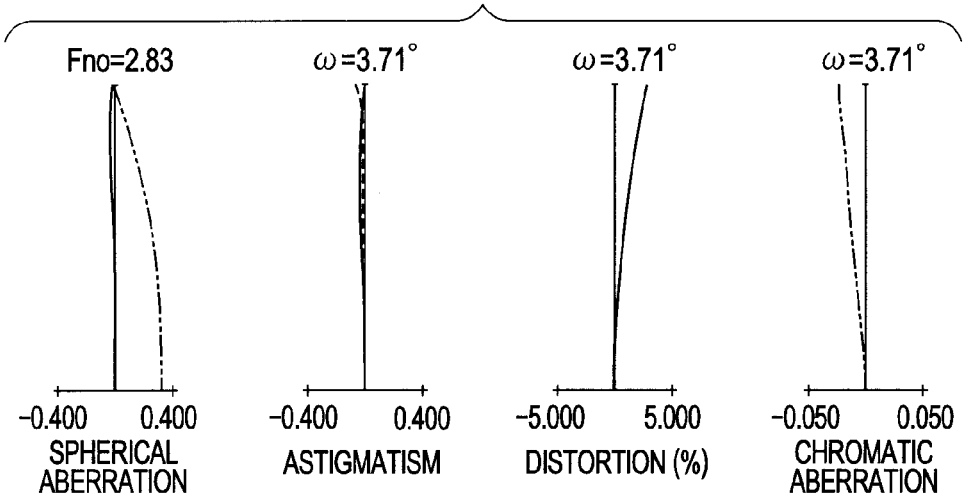
FIG. 8Ba is an aberration diagram at the telephoto end when focusing at an object distance of 7.0 m according to Embodiment 3 of the present invention.
Figure 8B:
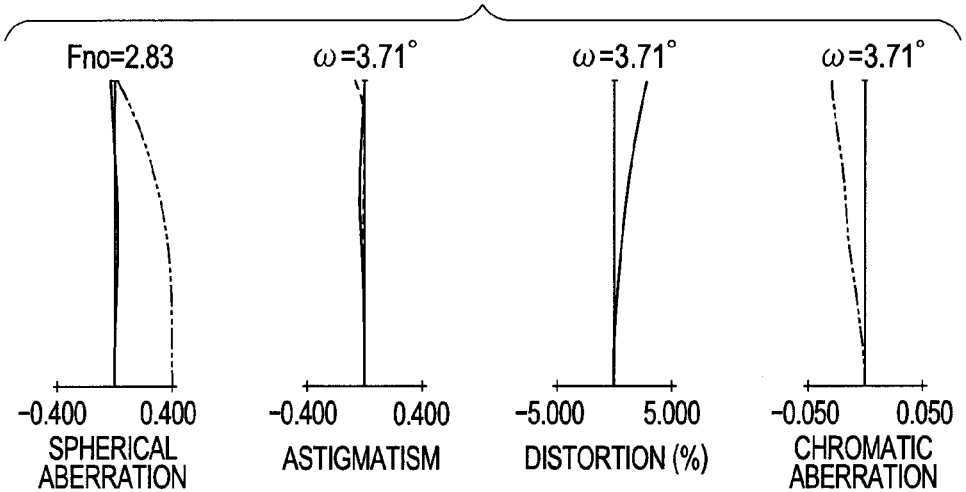
Figure 8B:
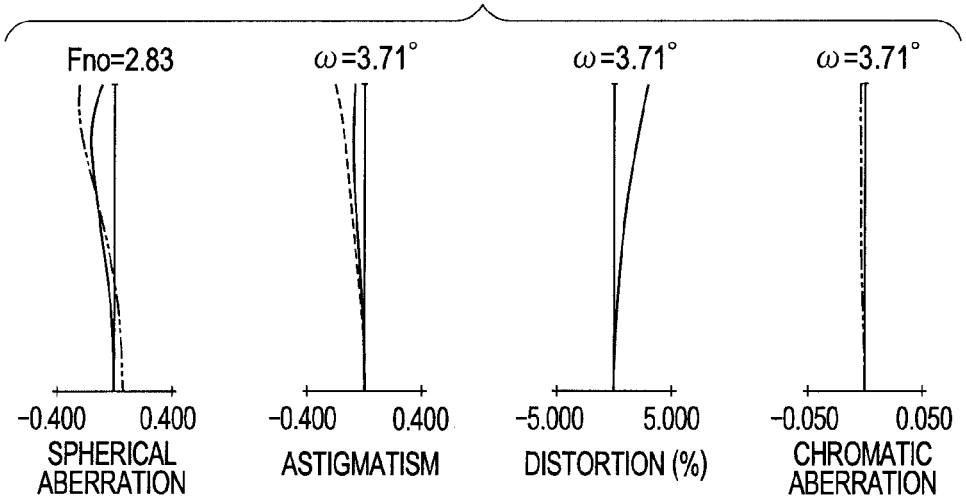

FIGS. 8Aa to 8Ac are aberration diagrams of Numerical Embodiment 3 at a wide-angle end when focusing at object distances of 7.0 m, infinity, and closest focusing distance (1.8 m), respectively. FIGS. 8Ba to 8Bc are aberration diagrams of Numerical Embodiment 3 at a telephoto end when focusing at object distances of 7.0 m, infinity, and closest focusing distance (1.8 m), respectively. Here, the object distance is a value with reference to the image plane.

Numerical values corresponding to the respective conditional expressions of this embodiment are shown in Table 1. This embodiment satisfies the conditional expressions (1) to (4) and achieves a high performance zoom lens having a high magnification, a small size and light weight, and little aberration deviation due to focus adjustment.

Numerical Embodiment 3

Unit: mm

Surface data

| Surface Number | r | d | nd | vd | Effective diameter |
|---|---|---|---|---|---|
| 1 | −6789.500 | 10.50 | 1.60311 | 60.6 | 140.00 |
| 2 | −345.130 | 17.49 | | | 137.64 |
| 3 | −303.194 | 3.30 | 1.69680 | 55.5 | 113.45 |
| 4 | 150.476 | 1.08 | | | 106.91 |
| 5 | 136.232 | 8.50 | 1.80809 | 22.8 | 107.04 |
| 6 | 269.163 | 13.16 | | | 106.11 |
| 7 | −207.861 | 3.20 | 1.77250 | 49.6 | 105.83 |
| 8 | 838.802 | 1.10 | | | 106.80 |
| 9 | 209.218 | 19.00 | 1.60311 | 60.6 | 108.43 |
| 10* | −179.947 | 0.20 | | | 108.23 |
| 11 | 215.993 | 3.10 | 1.84666 | 23.8 | 102.96 |
| 12 | 111.677 | 2.19 | | | 99.62 |
| 13 | 131.409 | 14.50 | 1.43387 | 95.1 | 99.65 |
| 14 | −733.250 | 0.20 | | | 99.14 |
| 15 | 174.259 | 10.00 | 1.43387 | 95.1 | 96.48 |
| 16 | −2457.684 | 0.20 | | | 95.43 |
| 17 | 102.512 | 10.00 | 1.49700 | 81.5 | 89.08 |
| 18 | 462.006 | (Variable) | | | 87.74 |
| 19* | 283.707 | 1.50 | 1.77250 | 49.6 | 43.16 |
| 20 | 29.964 | 10.36 | | | 36.89 |
| 21 | −50.860 | 1.20 | 1.61800 | 63.3 | 36.59 |
| 22 | 148.205 | 0.15 | | | 36.65 |
| 23 | 64.220 | 8.23 | 1.72047 | 34.7 | 36.94 |
| 24 | −50.217 | 1.30 | | | 36.63 |
| 25 | −38.357 | 1.20 | 1.61800 | 63.3 | 36.48 |
| 26 | −171.525 | (Variable) | | | 36.10 |
| 27 | −74.655 | 1.50 | 1.75500 | 52.3 | 33.56 |
| 28 | 336.170 | 3.50 | 1.92286 | 18.9 | 34.78 |
| 29 | −648.589 | (Variable) | | | 35.56 |
| 30 (Stop) | ∞ | 1.80 | | | 41.19 |
| 31 | 181.332 | 6.20 | 1.61800 | 63.3 | 42.70 |
| 32 | −83.419 | 0.20 | | | 43.12 |
| 33 | 198.303 | 4.50 | 1.60311 | 60.6 | 43.12 |
| 34 | −213.141 | 0.20 | | | 42.94 |
| 35 | 99.366 | 7.50 | 1.48749 | 70.2 | 42.02 |
| 36 | −70.150 | 1.50 | 2.00069 | 25.5 | 41.35 |
| 37 | 219.525 | 0.20 | | | 40.98 |

-continued

Unit: mm

| | | | | | |
|---|---|---|---|---|---|
| 38 | 43.957 | 7.50 | 1.58913 | 61.1 | 41.23 |
| 39 | −1109.090 | 22.77 | | | 40.47 |
| 40 | −146.133 | 1.00 | 1.88300 | 40.8 | 27.23 |
| 41 | 46.863 | 5.00 | 1.92286 | 18.9 | 26.49 |
| 42 | −888.361 | 11.70 | | | 25.83 |
| 43 | −47.369 | 1.00 | 1.88300 | 40.8 | 23.37 |
| 44 | 48.235 | 3.85 | | | 24.34 |
| 45 | 59.723 | 6.41 | 1.51633 | 64.1 | 28.90 |
| 46 | −58.081 | 2.43 | | | 30.11 |
| 47 | 99.274 | 5.61 | 1.48749 | 70.2 | 32.50 |
| 48 | −72.716 | 6.89 | | | 32.88 |
| 49 | 65.651 | 5.08 | 1.48749 | 70.2 | 33.03 |
| 50 | −173.806 | 4.60 | | | 32.67 |
| 51 | −46.195 | 1.30 | 1.80518 | 25.4 | 31.81 |
| 52 | −88.691 | | | | 32.21 |
| Image plane | ∞ | | | | |

Aspherical surface data

Tenth surface

K = −6.40245e−001  A4 = 2.99358e−008  A6 = 1.11596e−012
A8 = 4.00444e−017  A10 = −4.27972e−021  A12 = 4.50536e−025

Nineteenth surface

K = 2.13815e+001  A4 = 8.72526e−007  A6 = 3.93582e−011
A8 = 1.01444e−014  A10 = 1.85555e−017  A12 = 1.22156e−018

Various data

| | | | | | |
|---|---|---|---|---|---|
| Zoom ratio | 8.00 | | | | |
| Focal length | 30.00 | 60.00 | 90.00 | 120.00 | 240.00 |
| F-Number | 2.80 | 2.80 | 2.80 | 2.80 | 2.83 |
| Angle of field | 27.40 | 14.53 | 9.80 | 7.38 | 3.71 |
| Image height | 15.55 | 15.55 | 15.55 | 15.55 | 15.55 |
| Total lens length | 404.39 | 404.39 | 404.39 | 404.39 | 404.39 |
| BF | 43.13 | 43.13 | 43.13 | 43.13 | 43.13 |
| d18 | 0.69 | 44.02 | 62.57 | 73.48 | 93.22 |
| d26 | 95.54 | 42.79 | 20.97 | 10.04 | 3.74 |
| d29 | 11.12 | 20.54 | 23.81 | 23.84 | 10.39 |
| Entrance pupil position | 124.55 | 223.18 | 301.20 | 367.45 | 571.36 |
| Exit pupil position | −151.56 | −151.56 | −151.56 | −151.56 | −151.56 |
| Front principal point position | 149.93 | 264.69 | 349.60 | 413.48 | 515.50 |
| Rear principal point position | 13.13 | −16.87 | −46.87 | −76.87 | −196.87 |

Zoom lens unit data

| Unit | First surface | Focal length | Lens structure length | Front principal point position | Rear principal point position |
|---|---|---|---|---|---|
| 1 | 1 | 145.00 | 117.71 | 85.61 | 0.79 |
| 2 | 19 | −37.71 | 23.94 | 1.85 | −16.81 |
| 3 | 27 | −122.65 | 5.00 | −0.52 | −3.20 |
| 4 | 30 | 63.60 | 107.25 | 26.46 | −106.26 |

Embodiment 4

Figure 9A:
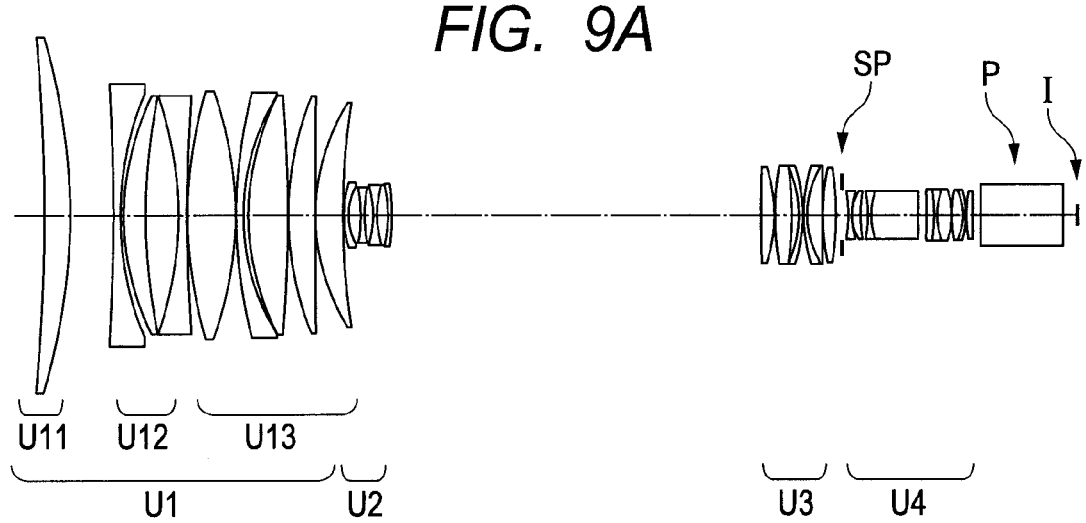
FIG. 9A is a lens cross sectional view at the wide-angle end when focusing at infinity according to Embodiment 4 of the present invention.
Figure 9B:
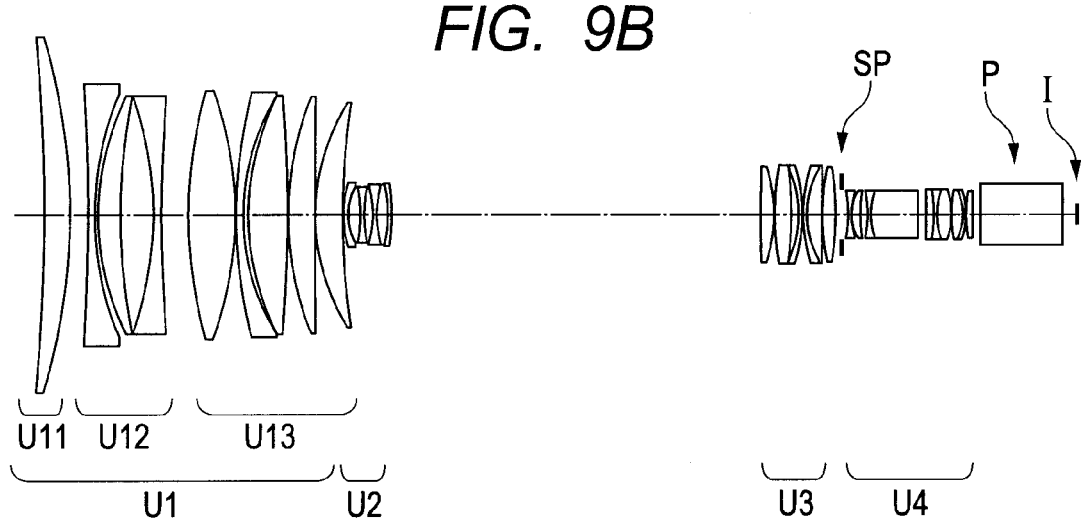
FIG. 9B is a lens cross sectional view at the wide-angle end when focusing at closest focusing distance according to Embodiment 4 of the present invention.

FIGS. 9A and 9B are lens cross sectional views of a zoom lens according to Embodiment 4 (Numerical Embodiment 4) of the present invention at a wide-angle end when focusing at infinity and closest focusing distance, respectively.

In FIGS. 9A and 9B, the zoom lens of this embodiment includes, in order from the object side (left side), a focus lens unit having positive refractive power as the first lens unit U1, a variator having negative refractive power for varying magnification as a second lens unit U2, a compensator having positive refractive power as a third lens unit U3, a stop SP, an imaging lens unit having positive refractive power and an image forming action as a fourth lens unit U4, a glass block P equivalent to a color separation prism, and an image pickup surface I. In this embodiment, the second lens unit U2 and the third lens unit U3 constitute the magnification-varying lens unit. The second lens unit U2 (variator) varies magnification from the wide-angle end to the telephoto end by moving monotonously on the optical axis toward the image plane side. The third lens unit U3 (compensator) moves on the optical axis toward the object side in order to correct image plane variation accompanying the magnification variation.

The first lens unit U1 in this embodiment corresponds to first to eighteenth surfaces. The first lens unit U1 includes the first sub-lens unit U11 having positive refractive power, the second sub-lens unit U12 having negative refractive power that moves toward the object side from the object distance of infinity to closest focusing distance, and the third sub-lens unit U13 having positive refractive power.

Figure 10A:
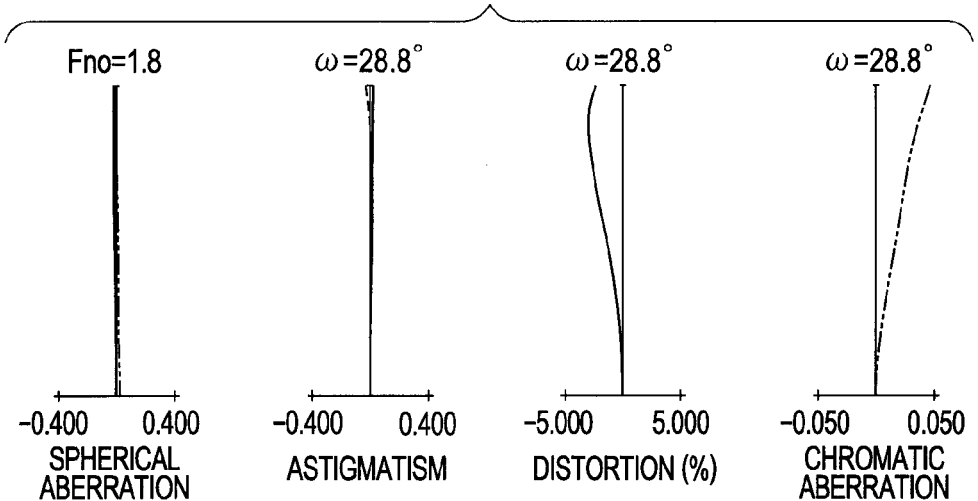
FIG. 10Aa is an aberration diagram at the wide-angle end when focusing at an object distance of 12.0 m according to Embodiment 4 of the present invention.
Figure 10A:
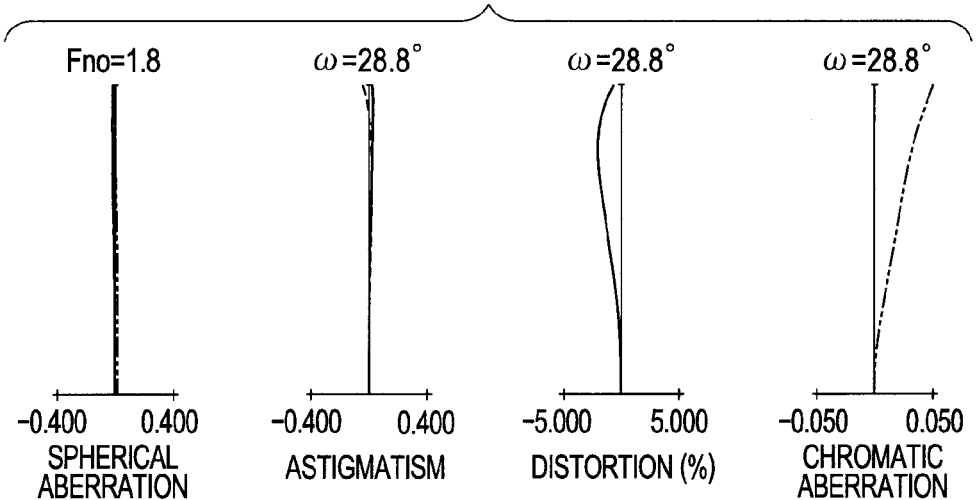
Figure 10A:
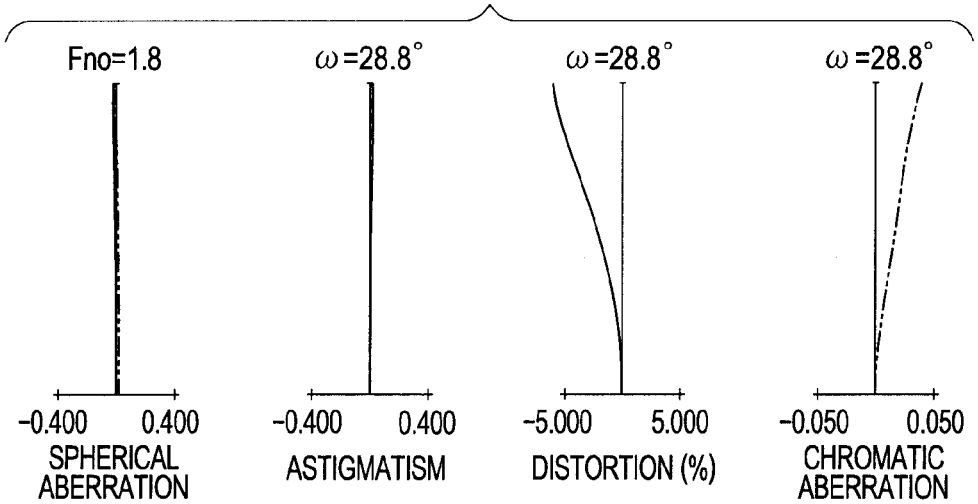
Figure 10B:
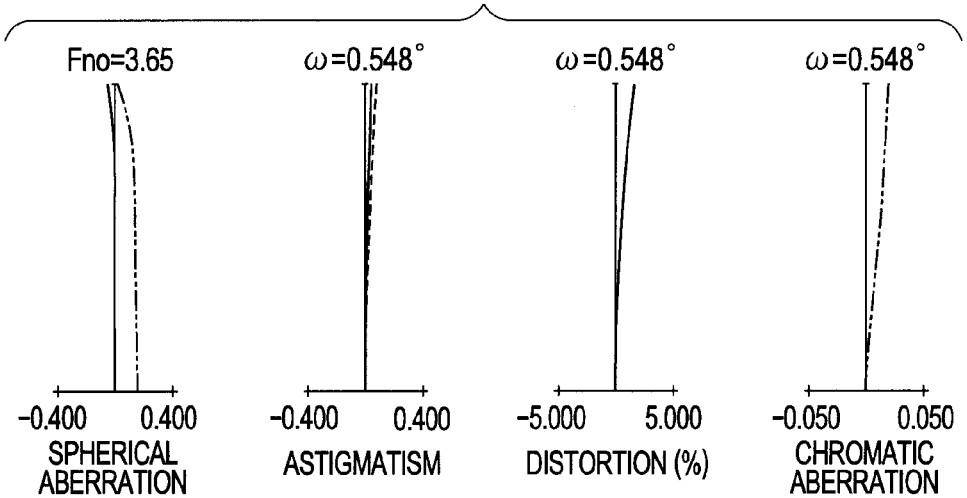
FIG. 10Ba is an aberration diagram at the telephoto end when focusing at an object distance of 12.0 m according to Embodiment 4 of the present invention.
Figure 10B:
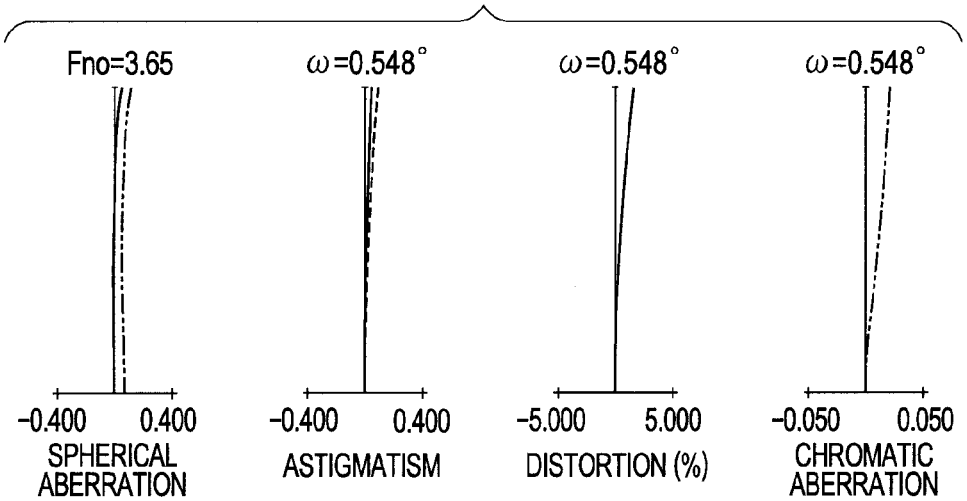
Figure 10B:
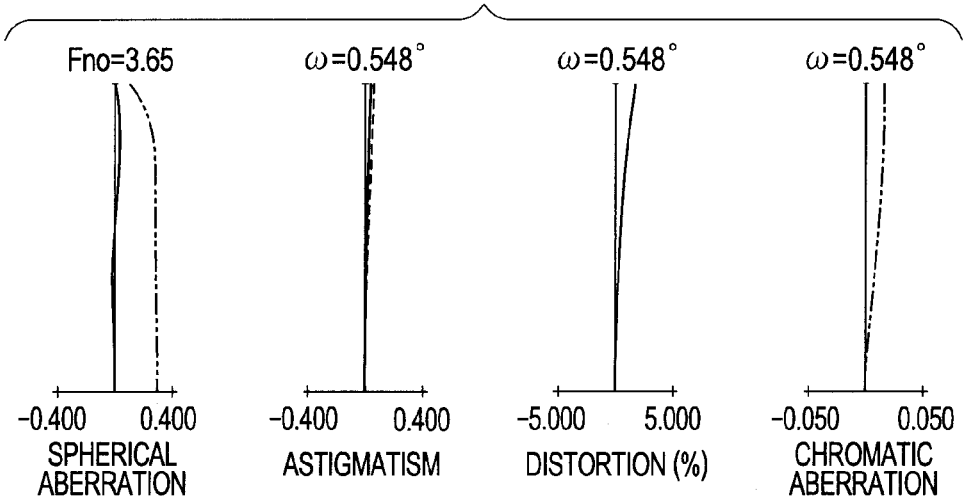

FIGS. 10Aa to 10Ac are aberration diagrams of Numerical Embodiment 4 at a wide-angle end when focusing at object distances of 12.0 m, infinity, and closest focusing distance (3.5 m), respectively. FIGS. 10Ba to 10Bc are aberration diagrams of Numerical Embodiment 4 when focusing at a telephoto end at object distances of 12.0 m, infinity, and closest focusing distance (3.5 m), respectively. Here, the object distance is a value with reference to the image plane.

Numerical values corresponding to the respective conditional expressions of this embodiment are shown in Table 1. This embodiment satisfies the conditional expressions (1) to (4) and achieves a high performance zoom lens having a high magnification, a small size and light weight, and little aberration deviation due to focus adjustment.

Numerical Embodiment 4

Unit: mm

Surface data

| Surface Number | r | d | nd | vd | Effective diameter |
|---|---|---|---|---|---|
| 1 | −1285.981 | 16.00 | 1.60311 | 60.6 | 238.38 |
| 2 | −453.992 | 28.16 | | | 235.09 |
| 3 | −1768.826 | 4.50 | 1.69680 | 55.5 | 175.79 |
| 4 | 224.939 | 1.49 | | | 160.13 |
| 5 | 193.428 | 15.00 | 1.80809 | 22.8 | 158.26 |
| 6 | 455.173 | 21.75 | | | 155.06 |
| 7 | −242.131 | 4.48 | 1.77250 | 49.6 | 153.26 |
| 8 | 974.415 | 1.54 | | | 158.98 |
| 9 | 328.024 | 31.00 | 1.60311 | 60.6 | 164.84 |
| 10* | −241.476 | 0.28 | | | 166.04 |
| 11 | 368.399 | 4.34 | 1.84666 | 23.8 | 163.70 |
| 12 | 161.235 | 3.31 | | | 159.44 |
| 13 | 180.379 | 26.00 | 1.43387 | 95.1 | 159.92 |
| 14 | −1097.243 | 0.28 | | | 160.06 |
| 15 | 222.573 | 18.00 | 1.43387 | 95.1 | 159.76 |
| 16 | 3816.603 | 0.28 | | | 158.79 |
| 17 | 153.559 | 18.00 | 1.49700 | 81.5 | 152.31 |
| 18 | 536.763 | (Variable) | | | 150.50 |
| 19 | 106.015 | 2.00 | 1.83481 | 42.7 | 43.51 |
| 20 | 45.344 | 7.96 | | | 39.11 |
| 21 | −96.098 | 1.90 | 1.81600 | 46.6 | 37.15 |
| 22 | 77.966 | 6.46 | | | 35.96 |
| 23 | −61.975 | 1.90 | 1.81600 | 46.6 | 36.60 |
| 24 | 84.864 | 7.47 | 1.92286 | 21.3 | 40.14 |
| 25 | −85.438 | 0.19 | | | 41.24 |
| 26 | −96.943 | 2.20 | 1.88300 | 40.8 | 41.42 |
| 27 | −187.725 | (Variable) | | | 42.73 |
| 28 | 667.229 | 9.00 | 1.59240 | 68.3 | 63.55 |
| 29 | −100.146 | 0.20 | | | 64.46 |
| 30 | 181.627 | 11.00 | 1.48749 | 70.2 | 65.29 |
| 31 | −266.580 | 4.67 | | | 64.96 |
| 32 | −92.130 | 2.50 | 1.72047 | 34.7 | 64.80 |
| 33 | −119.153 | 0.20 | | | 65.55 |

-continued

Unit: mm

| | | | | | |
|---|---|---|---|---|---|
| 34 | 114.356 | 2.50 | 1.84666 | 23.9 | 64.88 |
| 35 | 63.074 | 0.20 | | | 62.96 |
| 36 | 61.293 | 10.00 | 1.49700 | 81.5 | 63.20 |
| 37 | 693.894 | 0.20 | | | 62.94 |
| 38 | 150.756 | 9.00 | 1.48749 | 70.2 | 62.51 |
| 39 | −232.251 | (Variable) | | | 61.62 |
| 40 (Stop) | ∞ | 4.50 | | | 33.40 |
| 41 | −72.509 | 1.80 | 1.81600 | 46.6 | 31.84 |
| 42 | 71.706 | 0.20 | | | 31.36 |
| 43 | 36.874 | 5.70 | 1.80809 | 22.8 | 31.79 |
| 44 | 104.177 | 4.97 | | | 30.78 |
| 45 | −74.082 | 2.00 | 1.88300 | 40.8 | 30.04 |
| 46 | 60.183 | 30.00 | 1.80518 | 25.4 | 30.20 |
| 47 | 335.005 | 5.50 | | | 31.69 |
| 48 | −401.052 | 5.00 | 1.62041 | 60.3 | 32.52 |
| 49 | −85.159 | 0.20 | | | 33.03 |
| 50 | −336.524 | 1.50 | 1.83400 | 37.2 | 33.00 |
| 51 | 48.547 | 10.00 | 1.62041 | 60.3 | 33.15 |
| 52 | −46.006 | 0.20 | | | 33.68 |
| 53 | 149.836 | 7.00 | 1.48749 | 70.2 | 32.50 |
| 54 | −41.555 | 1.50 | 1.83400 | 37.2 | 31.73 |
| 55 | −104.772 | 0.20 | | | 31.58 |
| 56 | 89.157 | 5.00 | 1.62041 | 60.3 | 30.63 |
| 57 | ∞ | 5.00 | | | 29.35 |
| 58 | ∞ | 55.50 | 1.51633 | 64.2 | 40.00 |
| 59 | ∞ | | | | 40.00 |
| Image plane | ∞ | | | | |

Aspherical surface data
Tenth surface

K = −1.71174e+000  A4 = −2.64439e−010  A6 = 2.97633e−014
A8 = 5.28479e−017  A10 = −8.37625e−021  A12 = 4.10664e−025

Various data

| | | | | | |
|---|---|---|---|---|---|
| Zoom ratio | 57.46 | | | | |
| Focal length | 10.00 | 24.79 | 66.11 | 314.61 | 574.56 |
| F-Number | 1.80 | 1.80 | 1.80 | 2.00 | 3.65 |
| Angle of field | 28.81 | 12.51 | 4.76 | 1.00 | 0.55 |
| Image height | 5.50 | 5.50 | 5.50 | 5.50 | 5.50 |
| Total lens length | 676.29 | 676.29 | 676.29 | 676.29 | 676.29 |
| BF | 10.01 | 10.01 | 10.01 | 10.01 | 10.01 |
| d18 | 1.55 | 71.55 | 116.55 | 152.86 | 159.05 |
| d27 | 241.50 | 162.37 | 103.26 | 34.56 | 6.17 |
| d39 | 3.50 | 12.62 | 26.74 | 59.13 | 81.32 |
| Entrance pupil position | 190.70 | 375.76 | 727.28 | 2486.89 | 5104.09 |
| Exit pupil position | −2944.21 | −2944.21 | −2944.21 | −2944.21 | −2944.21 |
| Front principal point position | 200.67 | 400.35 | 791.91 | 2768.00 | 5566.90 |
| Rear principal point position | 0.01 | −14.78 | −56.10 | −304.60 | −564.55 |

Zoom lens unit data

| Unit | First surface | Focal length | Lens structure length | Front principal point position | Rear principal point position |
|---|---|---|---|---|---|
| 1 | 1 | 221.22 | 194.41 | 132.09 | −12.59 |
| 2 | 19 | −27.50 | 30.08 | 6.93 | −16.03 |
| 3 | 28 | 67.50 | 49.47 | 14.84 | −21.51 |
| 4 | 40 | 62.75 | 145.77 | 61.45 | 9.72 |

Embodiment 5

Figure 11A:
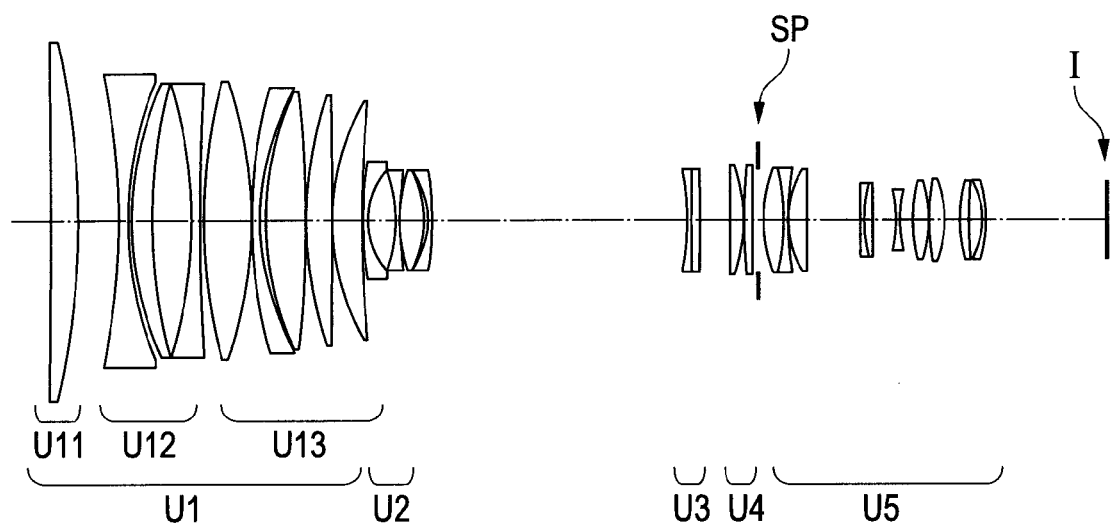
FIG. 11A is a lens cross sectional view at the wide-angle end when focusing at infinity according to Embodiment 5 of the present invention.
Figure 11B:
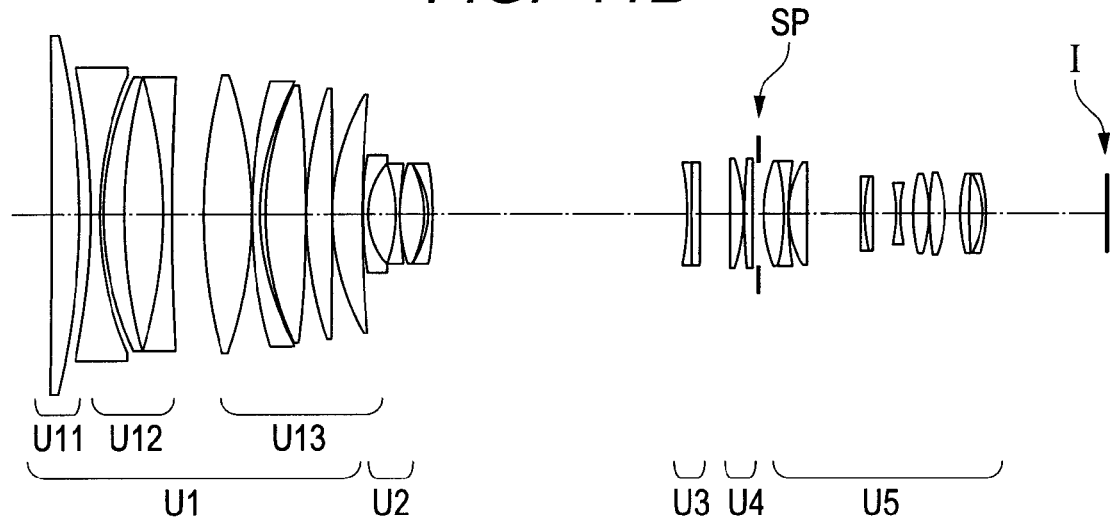
FIG. 11B is a lens cross sectional view at the wide-angle end when focusing at closest focusing distance according to Embodiment 5 of the present invention.

FIGS. 11A and 11B are lens cross sectional views of a zoom lens according to Embodiment 5 (Numerical Embodiment 5) of the present invention at a wide-angle end when focusing at infinity and closest focusing distance, respectively.

In FIGS. 11A and 11B, the zoom lens of this embodiment includes, in order from the object side (left side), a focus lens unit having positive refractive power as the first lens unit U1, a first variator having negative refractive power for varying magnification as a second lens unit U2, a second variator having negative refractive power for varying magnification as a third lens unit U3, a compensator having positive refractive power as a fourth lens unit U4, a stop SP, an imaging lens unit having positive refractive power and an image forming action as a fifth lens unit U5, and an image pickup surface I. In this embodiment, the second lens unit U2, the third lens unit U3, and the fourth lens unit U4 constitute the magnification-varying lens unit. The second lens unit U2 (first variator) varies magnification from the wide-angle end to the telephoto end by moving monotonously on the optical axis toward the image plane side. The third lens unit U3 (second variator) moves on the optical axis so as to vary magnification from the wide-angle end to the telephoto end. The fourth lens unit U4 (compensator) moves non-linearly on the optical axis in order to correct image plane variation accompanying magnification-varying. Note that, the third lens unit U3 may be the compensator and the fourth lens unit U4 may be the second variator.

The first lens unit U1 in this embodiment corresponds to first to eighteenth surfaces. The first lens unit U1 includes the first sub-lens unit U11 having positive refractive power, the second sub-lens unit U12 having negative refractive power that moves toward the object side from the object distance of infinity to closest focusing distance, and the third sub-lens unit U13 having positive refractive power.

Figure 12A:
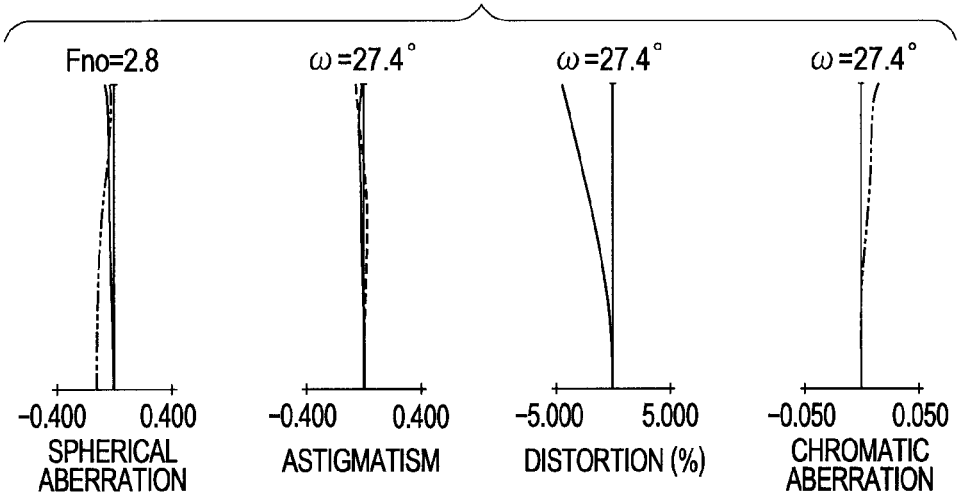
FIG. 12Aa is an aberration diagram at the wide-angle end when focusing at an object distance of 7.0 m according to Embodiment 5 of the present invention.
Figure 12A:
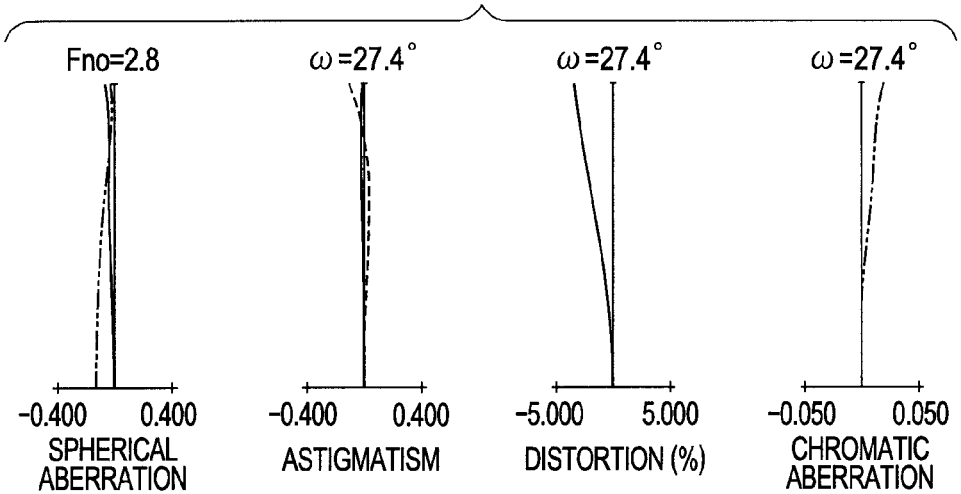
Figure 12A:
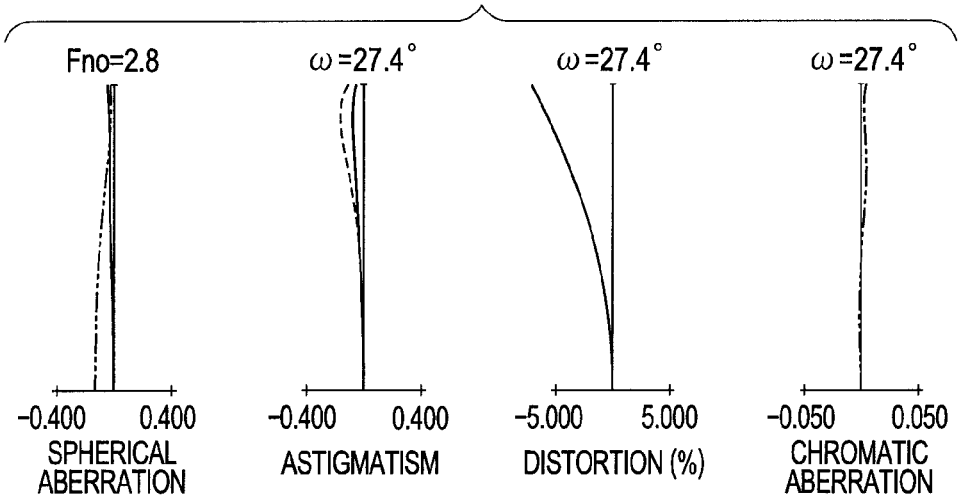
Figure 12B:
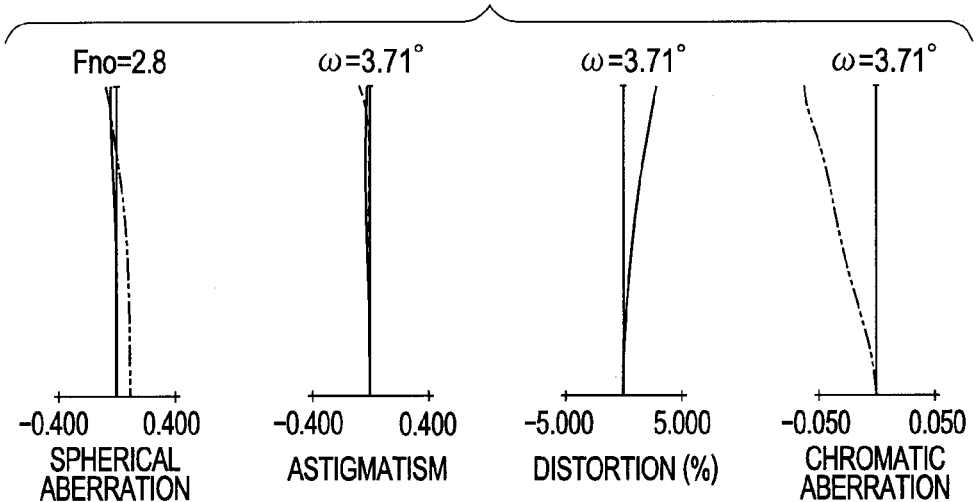
FIG. 12Ba is an aberration diagram at the telephoto end when focusing at an object distance of 7.0 m according to Embodiment 5 of the present invention.
Figure 12B:
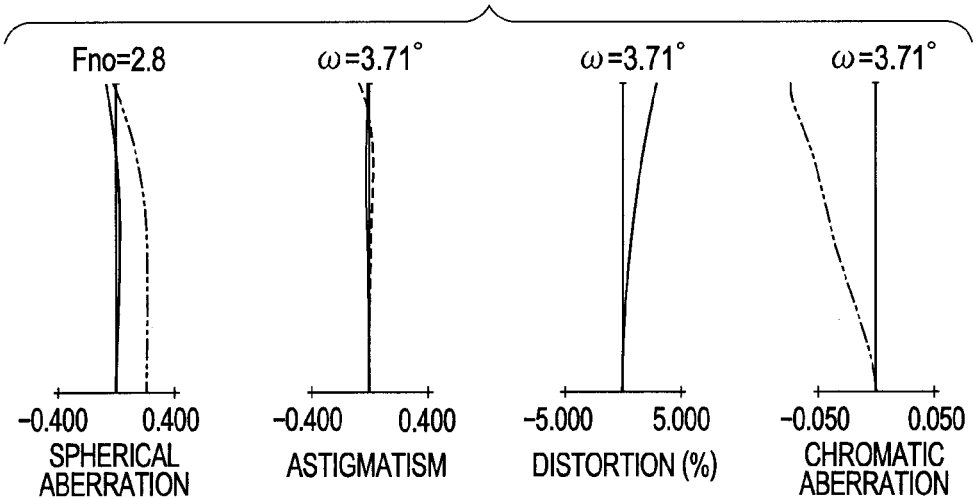
Figure 12B:
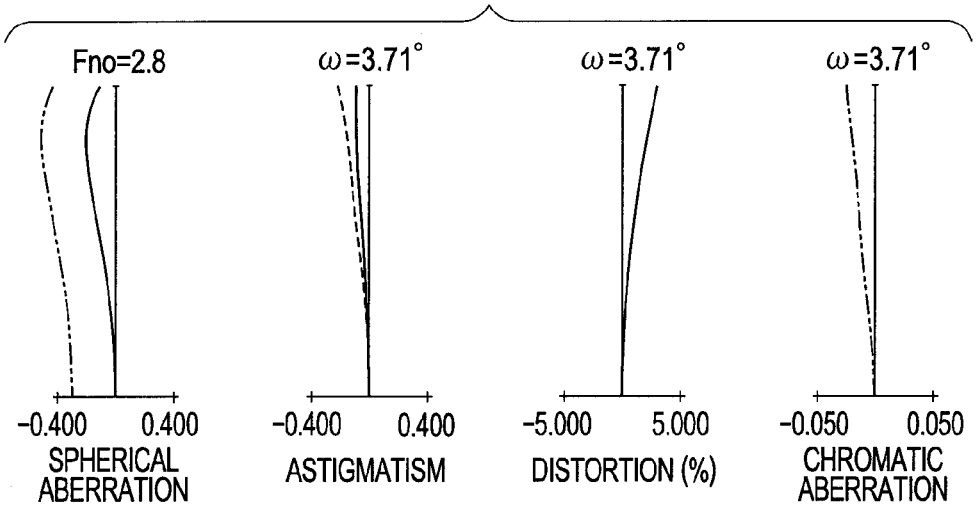

FIGS. 12Aa to 12Ac are aberration diagrams of Numerical Embodiment 5 at a wide-angle end when focusing at object distances of 7.0 m, infinity, and closest focusing distance (1.8 m), respectively. FIGS. 12Ba to 12Bc are aberration diagrams of Numerical Embodiment 5 at a telephoto end when focusing at object distances of 7.0 m, infinity, and closest focusing distance (1.8 m), respectively. Here, the object distance is a value with reference to the image plane.

Numerical values corresponding to the respective conditional expressions of this embodiment are shown in Table 1. This embodiment satisfies the conditional expressions (1) to (4) and achieves a high performance zoom lens having a high magnification, a small size and light weight, and little aberration deviation due to focus adjustment.

Numerical Embodiment 5

Unit: mm

Surface data

| Surface Number | r | d | nd | vd | Effective diameter |
|---|---|---|---|---|---|
| 1 | −6789.500 | 10.50 | 1.60311 | 60.6 | 135.86 |
| 2 | −331.597 | 15.17 | | | 133.40 |
| 3 | −286.734 | 3.30 | 1.69680 | 55.5 | 112.37 |
| 4 | 146.943 | 1.08 | | | 105.63 |

-continued

Unit: mm

| | | | | |
|---|---|---|---|---|
| 5 | 130.643 | 7.91 | 1.80809 | 22.8 | 105.43 |
| 6 | 227.276 | 14.48 | | | 104.20 |
| 7 | −189.724 | 3.20 | 1.77250 | 49.6 | 103.71 |
| 8 | 1008.616 | 1.10 | | | 104.21 |
| 9 | 218.041 | 17.50 | 1.60311 | 60.6 | 106.15 |
| 10* | −173.670 | 0.20 | | | 106.14 |
| 11 | 208.854 | 3.10 | 1.84666 | 23.8 | 100.83 |
| 12 | 112.833 | 2.07 | | | 97.41 |
| 13 | 133.357 | 14.84 | 1.43387 | 95.1 | 97.41 |
| 14 | −452.051 | 0.20 | | | 96.98 |
| 15 | 168.804 | 9.45 | 1.43387 | 95.1 | 94.17 |
| 16 | −3065.086 | 0.20 | | | 93.35 |
| 17 | 99.720 | 10.89 | 1.49700 | 81.5 | 90.55 |
| 18 | 523.590 | (Variable) | | | 89.60 |
| 19* | 230.232 | 1.50 | 1.77250 | 49.6 | 44.49 |
| 20 | 30.651 | 10.77 | | | 37.92 |
| 21 | −48.977 | 1.20 | 1.61800 | 63.3 | 37.66 |
| 22 | 127.503 | 0.15 | | | 37.60 |
| 23 | 64.327 | 9.08 | 1.72047 | 34.7 | 37.87 |
| 24 | −44.465 | 1.33 | | | 37.54 |
| 25 | −35.281 | 1.20 | 1.61800 | 63.3 | 37.36 |
| 26 | −183.716 | (Variable) | | | 36.94 |
| 27 | −93.624 | 1.50 | 1.75500 | 52.3 | 37.11 |
| 28 | 575.613 | 3.50 | 1.92286 | 18.9 | 38.14 |
| 29 | −474.068 | (Variable) | | | 38.82 |
| 30 | 924.013 | 5.04 | 1.61800 | 63.3 | 40.69 |
| 31 | −76.462 | 0.20 | | | 41.16 |
| 32 | 195.717 | 3.36 | 1.60311 | 60.6 | 41.32 |
| 33 | −774.105 | (Variable) | | | 41.20 |
| 34 (Stop) | ∞ | 2.00 | | | 40.18 |
| 35 | 57.778 | 7.64 | 1.48749 | 70.2 | 39.50 |
| 36 | −90.744 | 1.50 | 2.00069 | 25.5 | 38.85 |
| 37 | 122.152 | 0.20 | | | 38.26 |
| 38 | 41.057 | 7.04 | 1.58913 | 61.1 | 38.57 |
| 39 | 748.560 | 20.54 | | | 37.75 |
| 40 | −1351.796 | 1.00 | 1.88300 | 40.8 | 27.54 |
| 41 | 53.351 | 3.65 | 1.92286 | 18.9 | 26.84 |
| 42 | −634.824 | 9.07 | | | 26.38 |
| 43 | −42.932 | 1.00 | 1.88300 | 40.8 | 22.12 |
| 44 | 46.969 | 5.31 | | | 23.00 |
| 45 | 59.871 | 5.89 | 1.51633 | 64.1 | 28.94 |
| 46 | −56.336 | 0.15 | | | 29.84 |
| 47 | 93.037 | 6.07 | 1.48749 | 70.2 | 31.09 |
| 48 | −46.166 | 5.79 | | | 31.34 |
| 49 | 72.479 | 3.15 | 1.48749 | 70.2 | 29.65 |
| 50 | 131.640 | 5.46 | | | 29.04 |
| 51 | −30.964 | 1.30 | 1.80518 | 25.4 | 28.75 |
| 52 | −45.224 | | | | 29.51 |
| Image plane | ∞ | | | | |

Aspherical surface data

Tenth surface

K = −1.62375e+000   A4 = 8.55946e−009   A6 = 1.49002e−012
A8 = −1.39032e−016  A10 = 7.10924e−020  A12 = −1.33389e−023

Nineteenth surface

K = 7.95373e+001    A4 = 1.99377e−007   A6 = −6.86680e−010
A8 = 1.26008e−013   A10 = 1.08551e−016  A12 = −1.49475e−018

Various data

| | | | | | |
|---|---|---|---|---|---|
| Zoom ratio | 8.00 | | | | |
| Focal length | 30.00 | 61.04 | 89.49 | 121.39 | 240.01 |
| F-Number | 2.80 | 2.80 | 2.80 | 2.80 | 2.80 |
| Angle of field | 27.40 | 14.29 | 9.86 | 7.30 | 3.71 |
| Image height | 15.55 | 15.55 | 15.55 | 15.55 | 15.55 |
| Total lens length | 395.37 | 395.37 | 395.37 | 395.37 | 395.37 |
| BF | 45.37 | 45.37 | 45.37 | 45.37 | 45.37 |
| d18 | 0.69 | 41.94 | 57.63 | 68.51 | 87.53 |
| d26 | 95.62 | 37.16 | 13.89 | 3.10 | 17.85 |
| d29 | 11.12 | 25.50 | 30.34 | 29.52 | 2.04 |
| d33 | 1.80 | 4.63 | 7.36 | 8.10 | 1.80 |
| Entrance pupil position | 121.39 | 217.78 | 285.47 | 355.13 | 602.63 |
| Exit pupil position | −96.71 | −96.71 | −96.71 | −96.71 | −96.71 |
| Front principal point position | 145.05 | 252.60 | 318.60 | 372.81 | 437.23 |
| Rear principal point position | 15.37 | −15.67 | −44.12 | −76.01 | −194.63 |

Zoom lens unit data

| Unit | First surface | Focal length | Lens structure length | Front principal point position | Rear principal point position |
|---|---|---|---|---|---|
| 1 | 1 | 135.42 | 115.18 | 84.29 | 3.30 |
| 2 | 19 | −37.91 | 25.22 | 2.29 | −17.16 |
| 3 | 27 | −172.98 | 5.00 | −0.95 | −3.63 |
| 4 | 30 | 79.31 | 8.60 | 3.14 | −2.27 |
| 5 | 34 | 151.21 | 86.77 | 31.34 | −57.19 |

TABLE 1

Numerical values corresponding to the respective conditional expressions in Numerical Embodiments 1 to 5

| Conditional Expression | Numerical Embodiment | | | | |
|---|---|---|---|---|---|
| | 1 | 2 | 3 | 4 | 5 |
| (1) f1/f11 | 0.214 | 0.124 | 0.242 | 0.192 | 0.246 |
| (2) f1/ft | 0.626 | 0.495 | 0.604 | 0.385 | 0.562 |
| (3) f12/f13 | −1.259 | −1.654 | −1.322 | −1.484 | −1.243 |
| (4) fw/IS | 0.965 | 0.965 | 0.965 | 0.909 | 0.965 |

Embodiment 6

Figure 13:
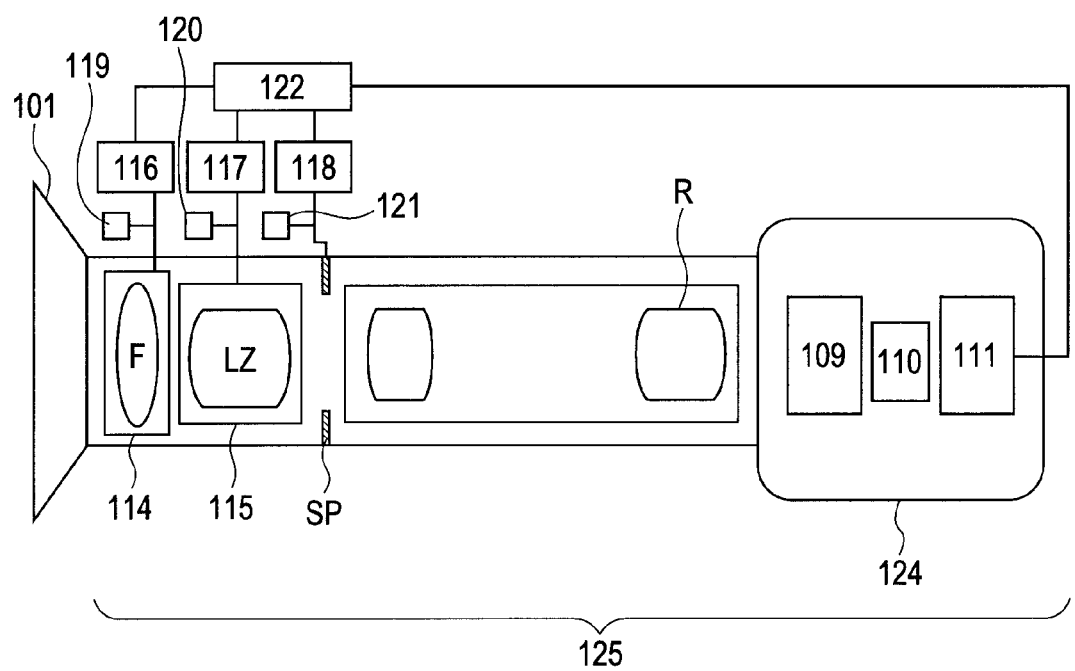
FIG. 13 is a schematic diagram of an image pickup apparatus according to Embodiment 6 of the present invention.

FIG. 13 is a schematic diagram of an image pickup apparatus according to Embodiment 6 of the present invention using any one of the zoom lenses of Embodiments 1 to 5 as an image pickup optical system. An image pickup apparatus 125 of the present invention includes a zoom lens 101 of any one of Embodiments 1 to 5 and a camera 124. The zoom lens 101 can be attached to and removed from the camera 124 and includes a first lens unit F including a lens unit for focus adjustment, a magnification-varying lens unit LZ, and a lens unit R for imaging. The zoom lens 101 further includes an aperture stop SP. The first lens unit F and the magnification-varying lens unit LZ are driven in an optical axis direction respectively by drive mechanisms 114 and 115 such as a helicoid or a cam. The drive mechanisms 114 and 115 and the aperture stop SP are electrically driven by motors (drive units) 116 to 118, respectively. Positions of the first lens unit F and the magnification-varying lens unit LZ on the optical axis and a stop diameter of the aperture stop SP are detected by detectors 119 to 121, respectively, such as an encoder, a potentiometer, or a photo sensor. The camera 124 includes a glass block 109 corresponding to an optical filter or a color separation optical system, and a solid-state image pickup element (photoelectric transducer) 110 such as a CCD sensor or a CMOS sensor for receiving light of a subject image formed by the zoom lens 101. In addition, CPUs 111 and 122 control various drives of the camera 124 and the zoom lens 101, respectively. In this way, through use of the zoom lens of the present invention for a television camera, an image pickup apparatus having high optical performance can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-069548, filed Mar. 28, 2011, which is hereby incorporated by reference herein in its entirety.

What is claimed is:

1. A zoom lens comprising, in order from an object side:
   a first lens unit having positive refractive power which does not move for varying magnification;
   a magnification-varying lens unit including at least two lens units which move for varying magnification;
   an aperture stop; and
   an imaging lens unit having positive refractive power which does not move for varying magnification,
   wherein the first lens unit includes, in order from the object side, a first sub-lens unit having positive refractive power, a second sub-lens unit having negative refractive power, and a third sub-lens unit having positive refractive power,
   wherein the second sub-lens unit is driven to the object side so as to perform a focus adjustment to an object at a short distance, and
   wherein the following expression is satisfied:

$$0.07 < f1/f11 < 0.35,$$

where f1 represents a focal length of the first lens unit, and f11 represents a focal length of the first sub-lens unit.

2. A zoom lens according to claim 1, wherein the following expression is satisfied:

$$0.2 < f1/ft < 1.0,$$

where ft represents a focal length of an entire system of the zoom lens at a telephoto end.

3. A zoom lens according to claim 1, wherein the following expression is satisfied:

$$-2.5 < f12/f13 < -0.8,$$

where f12 represents a focal length of the second sub-lens unit, and f13 represents a focal length of the third sub-lens unit.

4. An image pickup apparatus comprising:
   a zoom lens comprising, in order from an object side:
   a first lens unit having positive refractive power which does not move for varying magnification;
   a magnification-varying lens unit including at least two lens units which move for varying magnification;
   an aperture stop; and
   an imaging lens unit having positive refractive power which does not move for varying magnification,
   wherein the first lens unit includes, in order from the object side, a first sub-lens unit having positive refractive power, a second sub-lens unit having negative refractive power, and a third sub-lens unit having positive refractive power,
   wherein the second sub-lens unit is driven to the object side so as to perform a focus adjustment to an object at a short distance, and
   wherein the following expression is satisfied:

$$0.07 < f1/f11 < 0.35,$$

where f1 represents a focal length of the first lens unit, and f11 represents a focal length of the first sub-lens unit; and
   an image pickup element that performs photoelectric conversion of an image formed by the zoom lens.

5. An image pickup apparatus according to claim 4, wherein the following expression is satisfied:

$$0.7 < fw/IS < 2.4,$$

where fw represents a focal length of an entire system of the zoom lens at a wide-angle end, and IS represents an image size of the image pickup element.

* * * * *